United States Patent
Horn

(10) Patent No.: US 11,388,080 B2
(45) Date of Patent: Jul. 12, 2022

(54) DETECTING FALSE LINKUP STATES IN ETHERNET COMMUNICATION LINKS

(71) Applicant: CoMIRA Solutions Inc., Pittsburgh, PA (US)

(72) Inventor: Aaron Horn, Pittsburgh, PA (US)

(73) Assignee: CoMIRA Solutions Inc., Pittsburgh, PA (US)

( * ) Notice: Subject to any disclaimer, the term of this patent is extended or adjusted under 35 U.S.C. 154(b) by 234 days.

(21) Appl. No.: 16/750,265

(22) Filed: Jan. 23, 2020

(65) Prior Publication Data

US 2021/0234788 A1 Jul. 29, 2021

(51) Int. Cl.
*H04L 12/26* (2006.01)
*H04L 43/50* (2022.01)
*H04L 43/0823* (2022.01)

(52) U.S. Cl.
CPC .......... *H04L 43/50* (2013.01); *H04L 43/0823* (2013.01)

(58) Field of Classification Search
CPC .............................. H04L 43/0823; H04L 43/50

USPC .......................................................... 370/242
See application file for complete search history.

(56) References Cited

U.S. PATENT DOCUMENTS

| | | | |
|---|---|---|---|
| 2015/0160719 A1* | 6/2015 | Van Der Zanden | .... H04L 12/10 713/322 |
| 2017/0139872 A1* | 5/2017 | Ladd | ...................... G06F 13/362 |
| 2020/0252980 A1* | 8/2020 | Anand | ................... H04W 28/22 |

* cited by examiner

*Primary Examiner* — Gbemileke J Onamuti
(74) *Attorney, Agent, or Firm* — The Webb Law Firm

(57) ABSTRACT

A system for detecting a false linkup state in an Ethernet communication link includes at least one processor programmed or configured to determine a block type of a block of bits received from a serializer/deserializer (SerDes), increment a first counter based on determining that the block type of the block of bits corresponds to a data block type or an error block type, determine whether the first counter satisfies a first threshold, enable a flag indicating that there is a false linkup state in an Ethernet communication link, and transmit a message indicating that there is a false linkup state for the Ethernet communication link to an Ethernet network device that is a link partner of the Ethernet communication link. A method and a computer program product are also provided.

18 Claims, 19 Drawing Sheets

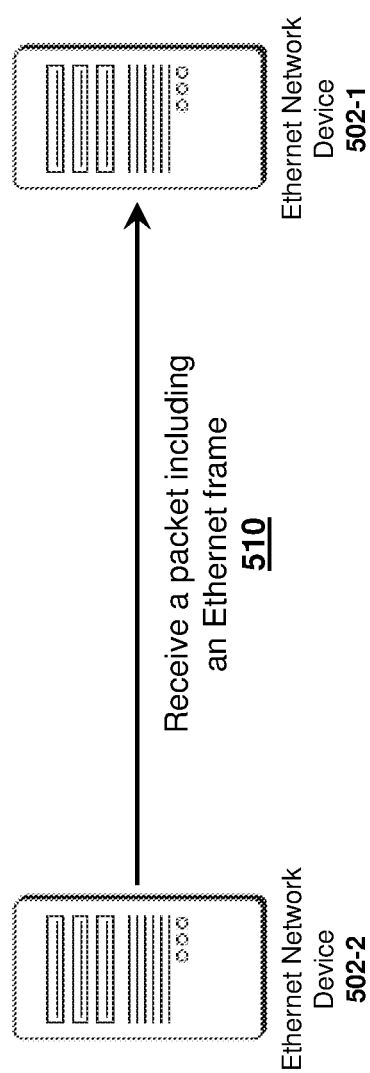
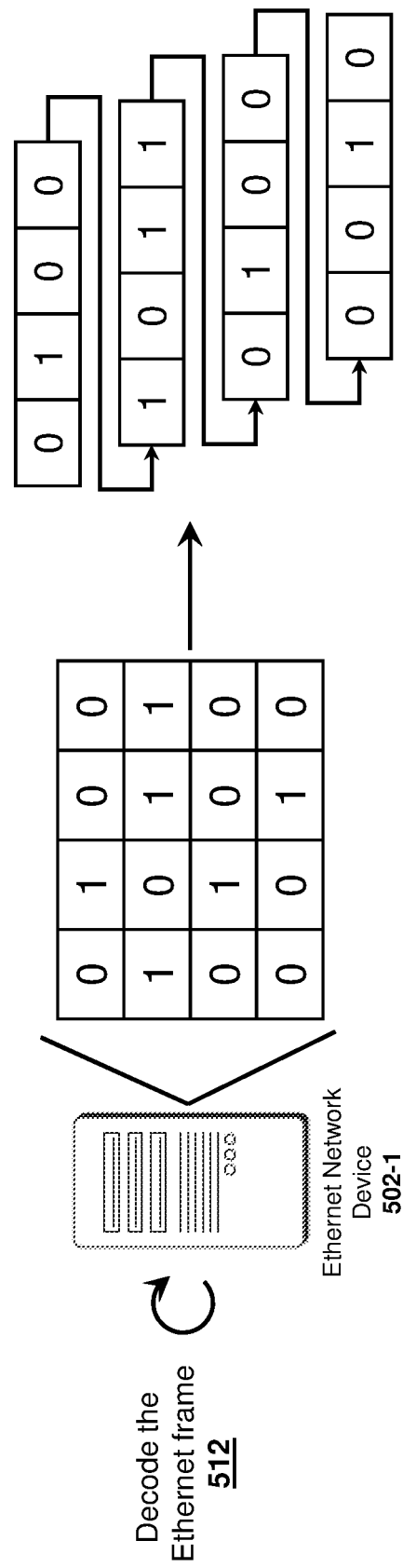
FIG. 5A
FIG. 5B

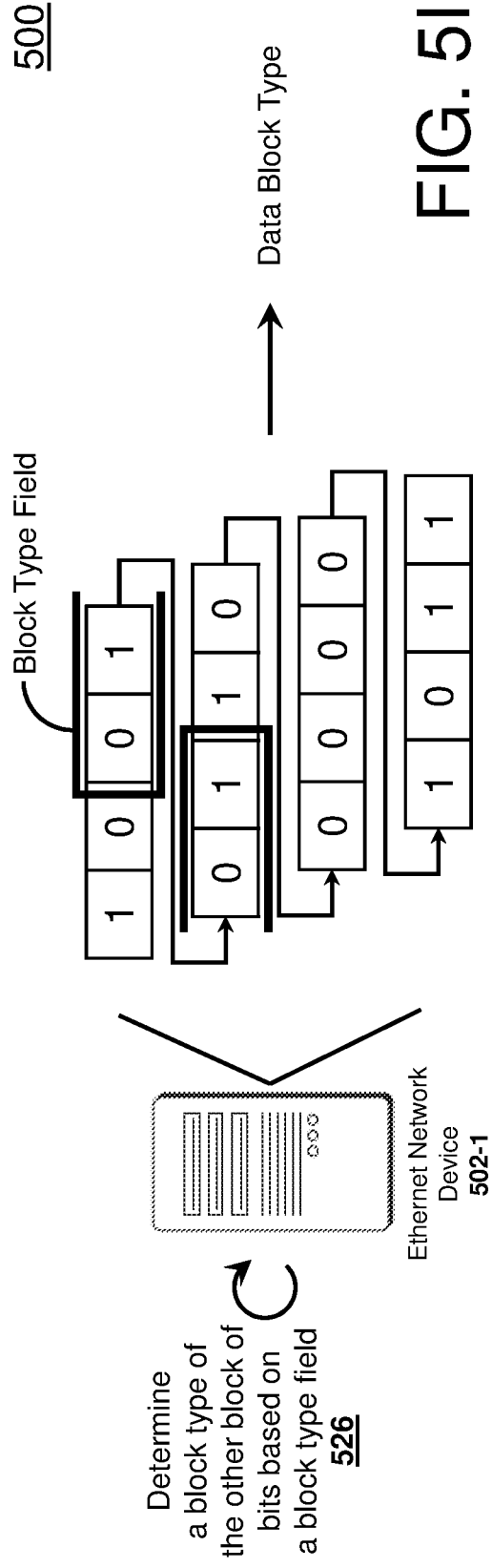

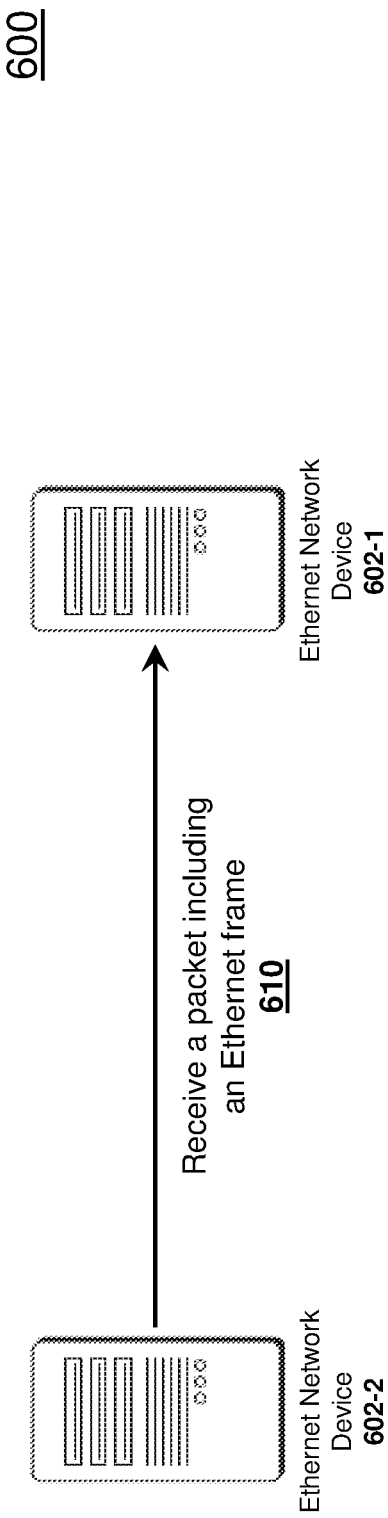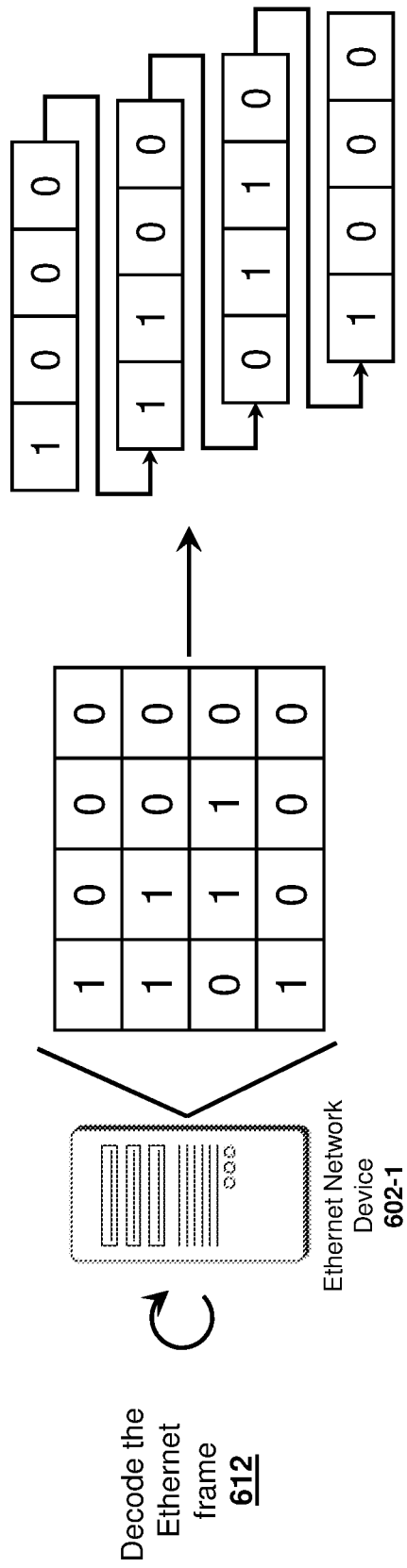
FIG. 6A
FIG. 6B

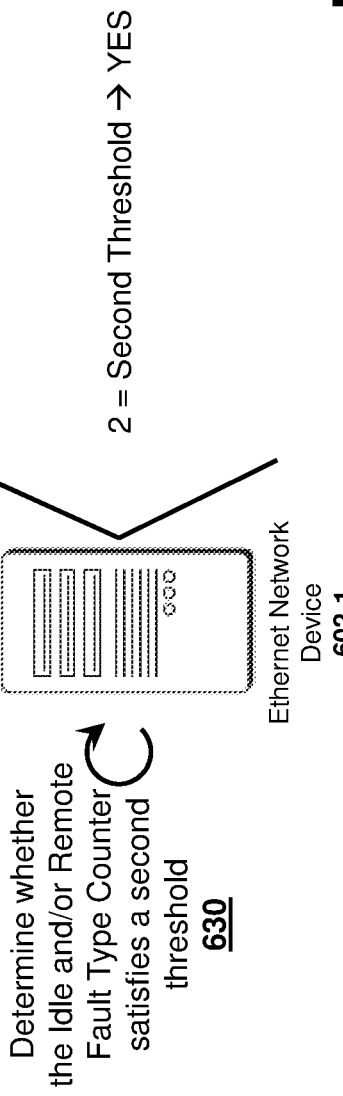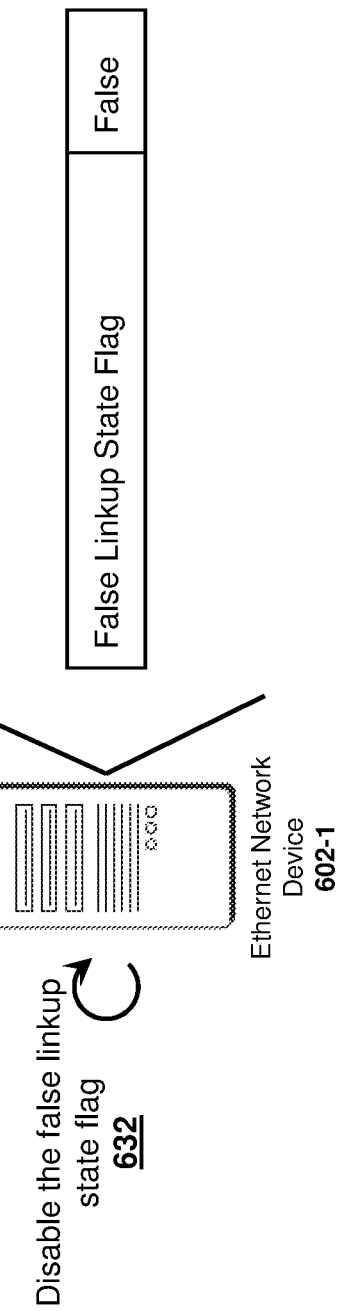

DETECTING FALSE LINKUP STATES IN ETHERNET COMMUNICATION LINKS

BACKGROUND

1. Field

This disclosure relates generally to systems, devices, computer program products, and methods that are used in Ethernet systems and, in particular embodiments, to systems, devices, computer program products, and methods for detecting a false linkup condition on an Ethernet communication link.

2. Technical Considerations

Ethernet may refer to a group of computer networking technologies that are used to connect devices via a shared physical medium (e.g., a cable such as coaxial cable, fiber optic cable, twisted pair cable, etc.) in local area networks (LAN), metropolitan area networks (MAN), and/or wide area networks (WAN). Ethernet data transfer rates may range between 2.94 megabits per second (Mbit/s) and 400 gigabits per second (Gbit/s) depending on the Ethernet mode that is used. As an example, 10 Gigabit Ethernet (e.g., 10GE, 10 GbE, or 10GigE) may refer to a group of computer networking technologies for transmitting Ethernet frames at a rate of 10 gigabits per second. Aspects of Ethernet have been standardized in IEEE standard 802.3. For example, IEEE standard 802.3 includes definitions regarding the physical layer and data link layer's media access control (MAC) of wired Ethernet.

Certain nomenclature may refer to error conditions that are present in Ethernet communication links. For example, jabber refers to a situation where a node (e.g., a network device) transmits a frame of data on the Ethernet communication link that exceeds a maximum frame length for the frame of the Ethernet communication link. In an Ethernet network, the maximum frame length may be equal to 1518 bytes, which includes 18 bytes of overhead and 1500 bytes of payload. A frame of data longer than 1518 bytes may be referred to as a "jabber frame." In addition, another name for jabbering may include "long packet error."

SUMMARY

Clause 1: A system for detecting a false linkup state in an Ethernet communication link, comprising: at least one processor programmed or configured to: determine a block type of a block of bits received from a serializer/deserializer (SerDes); increment a first counter based on determining that the block type of the block of bits corresponds to a data block type or an error block type; determine whether the first counter satisfies a first threshold; enable a false linkup state in an Ethernet communication link; and cause to transmit a message including an indication that there is a false linkup state for the Ethernet communication link to an Ethernet network device that is a link partner of the Ethernet communication link.

Clause 2: The system of clause 1, wherein the block of bits is associated with a packet received from the Ethernet network device that is the link partner of the Ethernet communication link, wherein the packet comprises an Ethernet frame that includes the block of bits.

Clause 3: The system of clauses 1 and 2, wherein the at least one processor is further programmed or configured to: receive a packet from the Ethernet network device, wherein the packet includes an Ethernet frame; and decode the Ethernet frame to provide the block of bits.

Clause 4: The system of any of clauses 1-3, wherein, when determining the block type of the block of bits, the at least one processor is programmed or configured to: determine the block type of the block of bits based on a block type field of the block of bits.

Clause 5: The system of any of clauses 1-4, wherein the at least one processor is further programmed or configured to: initialize the first counter based on determining that the block type of the block of bits does not correspond to a data block type or an error block type; and disable the false linkup state in the Ethernet communication link based on determining that the block type of the block of bits does not correspond to a data block type or an error block type.

Clause 6: The system of any of clauses 1-5, wherein the at least one processor is further programmed or configured to: determine a block type of a second block of bits after enabling the false linkup state in the Ethernet communication link; and increment a second counter based on determining that the block type of the second block of bits corresponds to an idle block type or a remote fault block type.

Clause 7: The system of any of clauses 1-6, wherein the at least one processor is further programmed or configured to: determine whether the second counter satisfies a second threshold; and disable the false linkup state in the Ethernet communication link based on determining that the second counter satisfies the second threshold.

Clause 8: The system of any of clauses 1-7, wherein the at least one processor is further programmed or configured to: initialize the second counter based on determining that the block type of the block of bits does not correspond to an idle block type or a remote fault block type.

Clause 9: A method for detecting a false linkup state in an Ethernet communication link, comprising: determining, with at least one processor, a block type of a block of bits; incrementing, with at least one processor, a first counter based on determining that the block type of the block of bits corresponds to a data block type or an error block type; determining, with at least one processor, whether the first counter satisfies a first threshold; enabling, with at least one processor, a false linkup state in an Ethernet communication link; and transmitting, with at least one processor, a message including an indication that there is a false linkup state for the Ethernet communication link to an Ethernet network device that is a link partner of the Ethernet communication link.

Clause 10: The method of clause 9, wherein the block of bits is associated with a packet received from the Ethernet network device that is the link partner, and wherein the packet comprises an Ethernet frame that includes the block of bits.

Clause 11: The method of clauses 9 and 10, further comprising: receiving a packet from the Ethernet network device, wherein the packet includes an Ethernet frame; and decoding the Ethernet frame to provide the block of bits.

Clause 12: The method of any of clauses 9-11, wherein determining the block type of the block of bits comprises: determining the block type of the block of bits based on a block type field of the block of bits.

Clause 13: The method of any of clauses 9-12, further comprising: initializing the first counter based on determining that the block type of the block of bits does not correspond to a data block type or an error block type; and disabling the false linkup state in the Ethernet communication link based on determining that the block type of the block of bits does not correspond to a data block type or an error block type.

Clause 14: The method of any of clauses 9-13, further comprising: determining a block type of a second block of bits after enabling the false linkup state in the Ethernet communication link; and incrementing a second counter based on determining that the block type of the second block of bits corresponds to an idle block type or a remote fault block type.

Clause 15: The method of any of clauses 9-14, further comprising: determining whether the second counter satisfies a second threshold; and disabling the false linkup state in the Ethernet communication link based on determining that the second counter satisfies the second threshold.

Clause 16: A computer program product for detecting a false linkup state in an Ethernet communication link, comprising at least one non-transitory computer-readable medium including one or more instructions that, when executed by at least one processor, cause the at least one processor to: determine a block type of a block of bits; increment a first counter based on determining that the block type of the block of bits corresponds to a data block type or an error block type; determine whether the first counter satisfies a first threshold; enable a false linkup state in an Ethernet communication link; and transmit an indication that there is a false linkup state for the Ethernet communication link to an Ethernet network device that is a link partner of the Ethernet communication link.

Clause 17: The computer program product of clause 16, wherein the block of bits is associated with a packet received from the Ethernet network device that is the link partner, wherein the packet comprises an Ethernet frame that includes the block of bits.

Clause 18: The computer program product of clauses 16 and 17, wherein the one or more instructions further cause the at least one processor to: initialize the first counter based on determining that the block type of the block of bits does not correspond to a data block type or an error block type.

Clause 19: The computer program product of any of clauses 16-18, wherein the one or more instructions further cause the at least one processor to: determine a block type of a second block of bits after enabling the false linkup state in the Ethernet communication link; and increment a second counter based on determining that the block type of the second block of bits corresponds to an idle block type or a remote fault block type.

Clause 20: The computer program product of any of clauses 16-19, wherein the one or more instructions further cause the at least one processor to: determine whether the second counter satisfies a second threshold; and disable the false linkup state in the Ethernet communication link based on determining that the second counter satisfies the second threshold.

BRIEF DESCRIPTION OF THE DRAWINGS

FIGS. 5A-5M are diagrams of an implementation of a non-limiting embodiment of a process shown in FIG. 3; and FIGS. 6A-6L are diagrams of an implementation of a non-limiting embodiment of a process shown in FIG. 4.

DETAILED DESCRIPTION

Figure 1A:
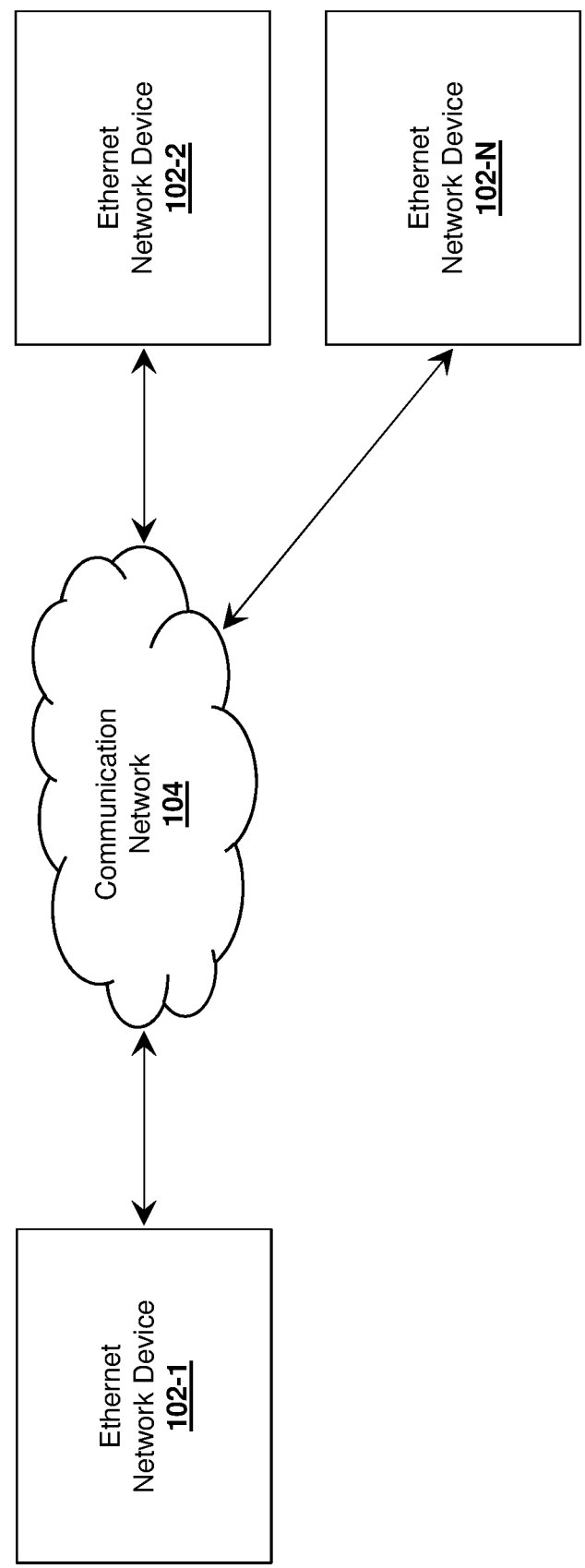
FIG. 1A is a diagram of a non-limiting embodiment of an environment in which systems and/or methods, described herein, may be implemented.

The following detailed description of non-limiting embodiments refers to the accompanying drawings. The same reference numbers in different drawings may identify the same or similar elements. Further, the description that follows is with regard to 10GE and 25 Gigabit Ethernet (25GE) modes of Ethernet systems, however, non-limiting embodiments of the present disclosure may be applicable to Ethernet systems based on IEEE standard 802.3 generally.

In some non-limiting embodiments, a first Ethernet network device may form an Ethernet communication link with a second Ethernet network device. At some point following formation of the Ethernet communication link between the first Ethernet network device and the second Ethernet network device, there may be a loss of synchronization of blocks of bits (e.g., a loss of block lock) received by the first Ethernet network device. During a loss of synchronization, a physical coding sublayer (PCS) block of the first Ethernet network device may receive a signal from a serializer/deserializer (SerDes) of the first Ethernet network device which may provide a repeating pattern of bits that have a value of 0 and 1 to the PCS block of the first Ethernet network device. The PCS block may improperly determine that the repeating pattern indicates that the Ethernet communication link between the first Ethernet network device and the second Ethernet network device is valid (e.g., in a valid state that allows information to be transmitted and received via the Ethernet communication link).

Any Ethernet mode that performs a block lock process may perceive the repeating pattern of bits as blocks of bits containing valid synchronization headers and the first Ethernet network device may either lose and regain synchronization or remain synchronized through a transition from valid data to the repeating pattern of bits. In 10GE and 25GE modes, without forward error correction (FEC), the PCS block of the first Ethernet network device may provide an indication that a status of the Ethernet communication link with the second Ethernet network device is valid (e.g., that a false linkup state is not enabled or is disabled) even when losing and regaining synchronization or remaining synchronized through a transition from valid data to the repeating pattern of bits.

In the situation described above, the PCS block of the first Ethernet network device may indicate that the status of the Ethernet communication link with the second Ethernet network device is valid despite that the first Ethernet network device is not receiving packets from the link partner, the second Ethernet network device. In this way, the PCS block may be prevented from sending a local fault indication to a link fault state machine of the first Ethernet network device, which in turn prevents a transmitting media access controller (MAC) from sending a remote fault indication to the second Ethernet network device.

In addition, the situation described above may be difficult to detect by the first Ethernet network device. In some non-limiting embodiments, an indication that the Ethernet communication link is in a false linkup state may be that an error counter of a PCS decoder of the first Ethernet network device will be incremented based on a decoder error. A decoder error may be present when an invalid synchronization header and/or a control synchronization header with an invalid block type are decoded by the PCS decoder. However, decoder errors may not be a reliable indication that the Ethernet communication link is in a false linkup state because decoder errors may be present when the Ethernet communication link is in a valid linkup state as well. In addition, in a situation where the SerDes appears to be providing data synchronization headers to the PCS block, despite that the SerDes is simply providing the repeating pattern of bits that have a value of 0 and 1, there is no indication that the Ethernet communication link is in a false linkup state.

Non-limiting embodiments, as disclosed herein, include systems, devices, computer program products, and methods, for detecting a false linkup state in the Ethernet communication link. In some non-limiting embodiments, a system may include at least one processor programmed or configured to, determine a type of a block of bits, increment a first counter based on determining that the type of the block of bits corresponds to a data type or a control type, determine whether the first counter satisfies a first threshold, enable a flag indicating that there is a false linkup state in the Ethernet communication link, and transmit a message indicating that there is a false linkup state for the Ethernet communication link to an Ethernet network device that is a link partner of the Ethernet communication link.

Accordingly, embodiments of the present disclosure allow for quickly and accurately determining there is a false linkup state in the Ethernet communication link. In this way, embodiments of the present disclosure may reduce an amount of data that is required to be re-transmitted over the Ethernet communication link based on the false linkup state in the Ethernet communication link. Additionally, embodiments of the present disclosure may reduce the consumption of network resources used by the Ethernet network device when the Ethernet network device transmits packets but is unaware that a link partner (e.g., another Ethernet network device) is not able to receive the packets. In addition, embodiments of the present disclosure may reduce the complexity of network devices such that forward error correction may not need to be used.

Referring now to FIG. 1A, FIG. 1A is a diagram of a non-limiting embodiment of an environment 100 in which systems, devices, computer program products, and methods, described herein, may be implemented. As shown in FIG. 1A, environment 100 includes Ethernet network devices 102-1 through 102-N (referred to collectively as "Ethernet network devices 102," and individually as "Ethernet network device 102") and communication network 104. Systems and/or devices of environment 100 (e.g., Ethernet network device 102-1 and Ethernet network device 102-2, Ethernet network device 102-1 and Ethernet network device 102-N, etc.) may interconnect via wired connections, wireless connections, or a combination of wired and wireless connections.

In some non-limiting embodiments, Ethernet network device 102 includes one or more devices capable of transmitting and/or receiving data units according to an Ethernet network technology, determining information associated with the data units, and/or the like. For example, Ethernet network device 102 may include a network interface card (NIC), a computing device, such as a server, a desktop computer, and/or the like. Further details regarding non-limiting embodiments of Ethernet network device 102 are provided below with regard to FIGS. 1B, 1C, and 2.

In some non-limiting embodiments, communication network 104 may include one or more wired and/or wireless networks. For example, communication network 104 may include a communications link, a computer network, an Internet Protocol (IP) network, an Ethernet network, a bus network, a fiber optic-based network, a local area network (LAN), a wide area network (WAN), a metropolitan area network (MAN), a telephone network (e.g., the public switched telephone network (PSTN)), a private network, an ad hoc network, an intranet, the Internet, a cloud computing network, a cellular network (e.g., a long-term evolution (LTE) network, a third generation (3G) network, a fourth generation (4G) network, a code division multiple access (CDMA) network, etc.), a public land mobile network (PLMN), and/or the like, and/or a combination of these or other types of networks. In some non-limiting embodiments, communication network 104 may interconnect a plurality of Ethernet network devices 102.

The number and arrangement of systems, devices, and networks shown in FIG. 1A are provided as an example. There may be additional devices and/or networks, fewer devices and/or networks, different devices and/or networks, or differently arranged devices and/or networks than those shown in FIG. 1A. Furthermore, two or more devices shown in FIG. 1A may be implemented within a single device, or a single device shown in FIG. 1A be implemented as multiple, distributed devices. Additionally or alternatively, a set of systems or a set of devices (e.g., one or more systems, one or more devices) of environment 100 may perform one or more functions described as being performed by another set of systems or another set of devices of environment 100.

Figure 1B:
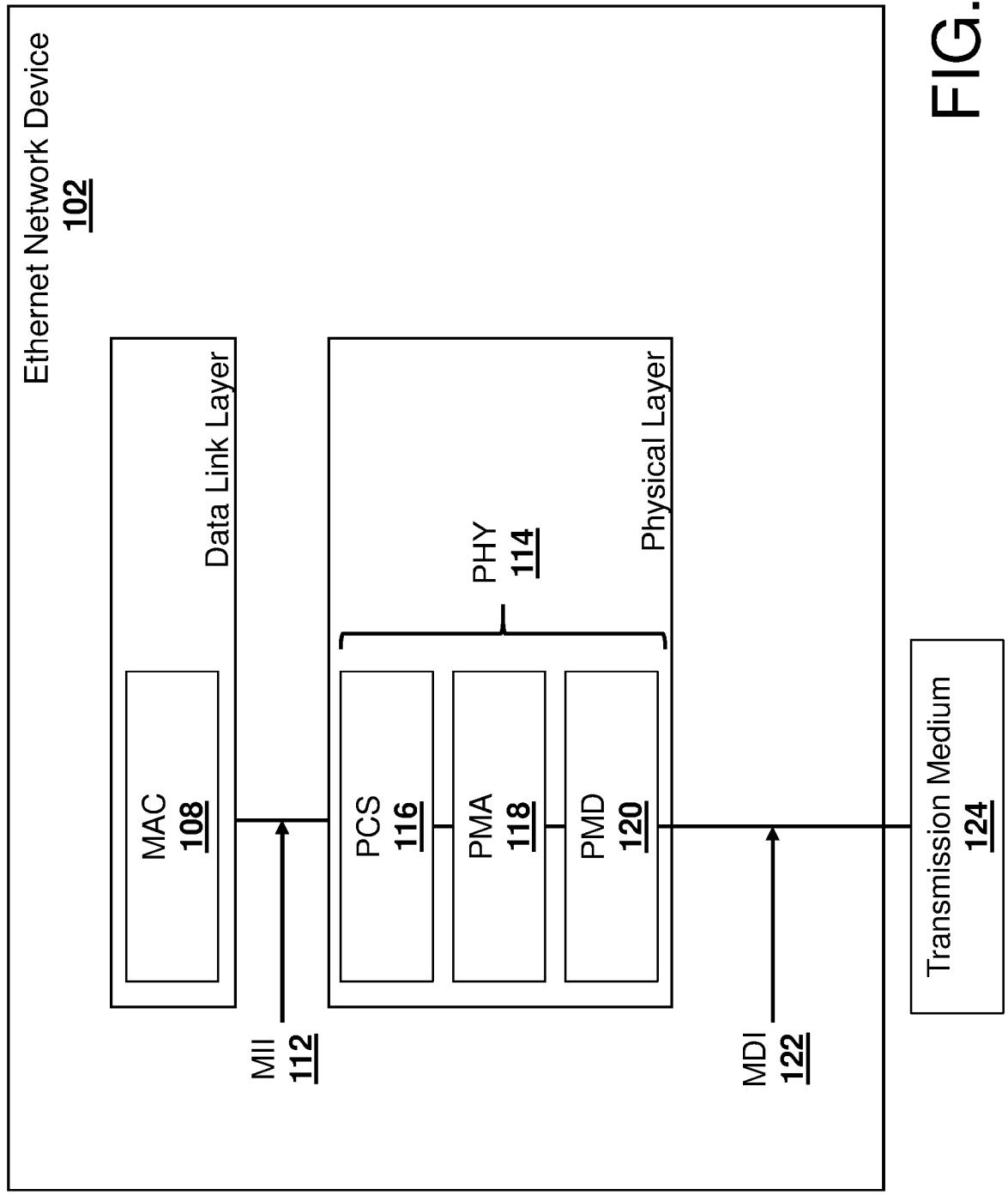
FIGS. 1B and 1C are diagrams of a non-limiting embodiment of an architecture of an Ethernet network device shown in FIG. 1A.
Figure 1C:
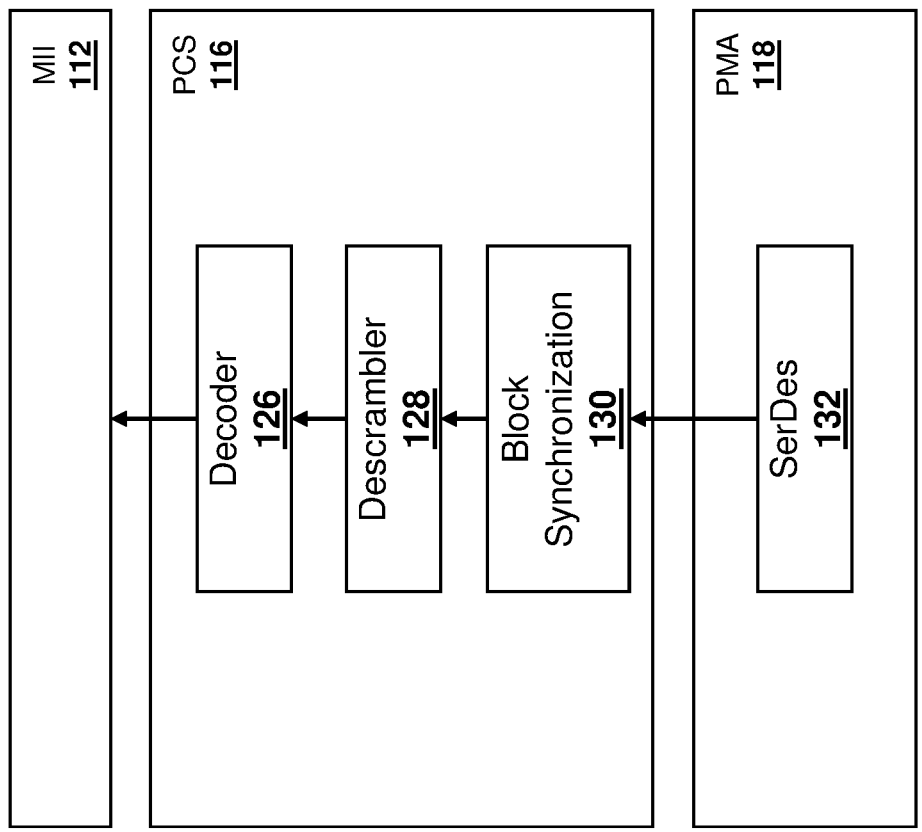

Referring now to FIGS. 1B and 1C, FIGS. 1B and 1C are diagrams of an example architecture of Ethernet network device 102. The architecture of Ethernet network device 102 may be associated with IEEE standard 802.3 clause 49. As shown in FIG. 1B, Ethernet network device 102 may include medium access control (MAC) block 108, media independent interface (MII) 112, physical layer chip (PHY) 114, and medium-dependent interface (MDI) 122. PHY 114 may include physical coding sublayer (PCS) block 116, physical medium attachment (PMA) block 118, and physical medium dependent (PMD) block 120. In some non-limiting embodiments, MAC block 108 may include one or more data link layer devices, one or more components, and/or functionality that control hardware components of Ethernet network device 102 that are responsible for interaction with transmission medium 124. In some non-limiting embodiments, MII 112 may include one or more devices, one or more components, and/or functionality for connecting PHY 114 to MAC block 108. In some non-limiting embodiments, PHY 114 may include one or more physical layer devices, one or more components, and/or functionality that implement physical layer operations, such as providing analog signal physical access to an Ethernet communication link. In some non-limiting embodiments, MDI 122 may include one or more devices, one or more components, and/or functionality that provide an interface between PHY 114 and transmission medium 124. In some non-limiting embodiments, transmission medium 124 may include a physical medium (e.g., a cable such as coaxial cable, fiber optic cable, twisted pair cable, etc.) over which the Ethernet communication link is established, such that packets are transmitted and received via the physical medium.

As shown in FIG. 1C, PCS block 116 may include decoder block 126, descrambler block 128, and block synchronization function 130. In some non-limiting embodiments, each of decoder block 126, descrambler block 128, and block synchronization function 130 may include one or more devices, one or more components, and/or functionality as described in IEEE standard 802.3 clause 49. For example, decoder block 126 may be capable of performing operations associated with a 64b/66b encoding/decoding scheme. In such an example, descrambler block 128 may be capable of performing operations associated with processing a payload to reverse the effect of a scrambler block of a PCS receive block. In such an example, block synchronization function 130 may synchronize (e.g., obtain block lock to) blocks of bits that are 66-bits in size in a bit stream using synchronization headers of the blocks of bits and block synchronization function 130 may output 66-bit blocks of bits based on synchronizing the blocks of bits. As further shown in FIG. 1C, PMA block 118 may include serializer/deserializer (SerDes) block 132 and SerDes block 132 may include one or more devices, one or more components, and/or functionality associated with receiving packets in the form of a serial bit stream and providing a parallel output in the form of a set of bits (e.g., 16 bits).

Figure 2:
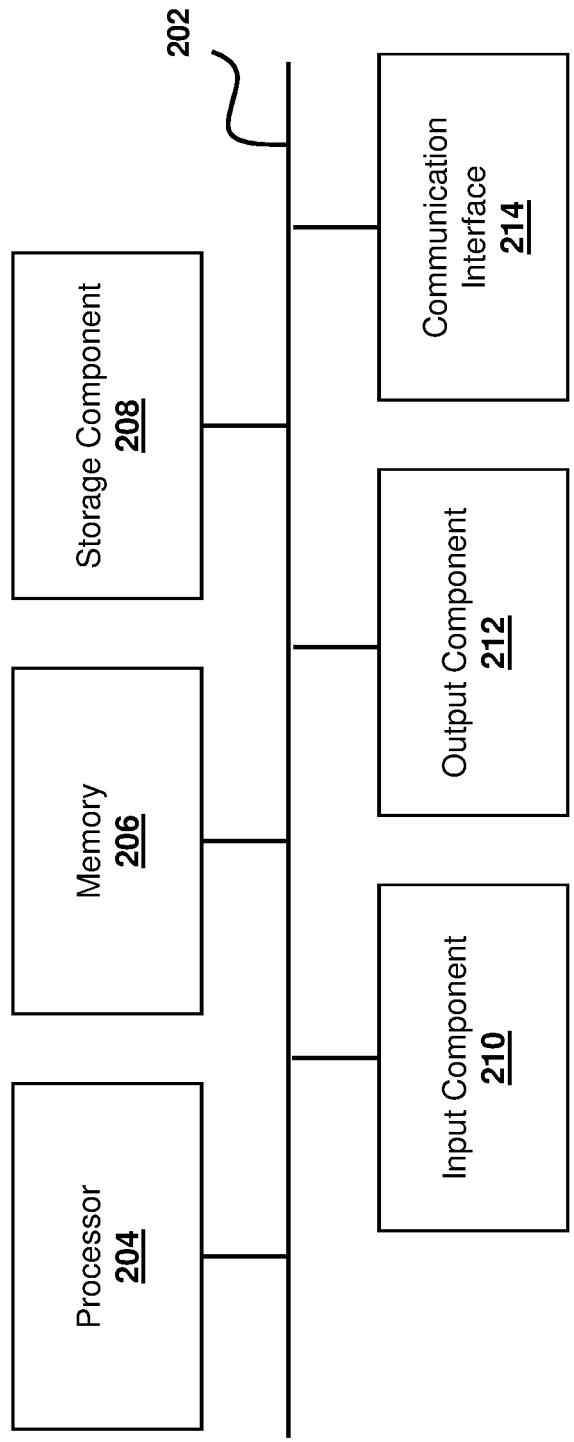
FIG. 2 is a diagram of a non-limiting embodiment of components of an Ethernet network device shown in FIG. 1A or 1B.

Referring now to FIG. 2, FIG. 2 is a diagram of example components of a device 200. Device 200 may correspond to one or more Ethernet network devices 102 or one or more components of Ethernet network device 102. In some non-limiting embodiments, Ethernet network device 102 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
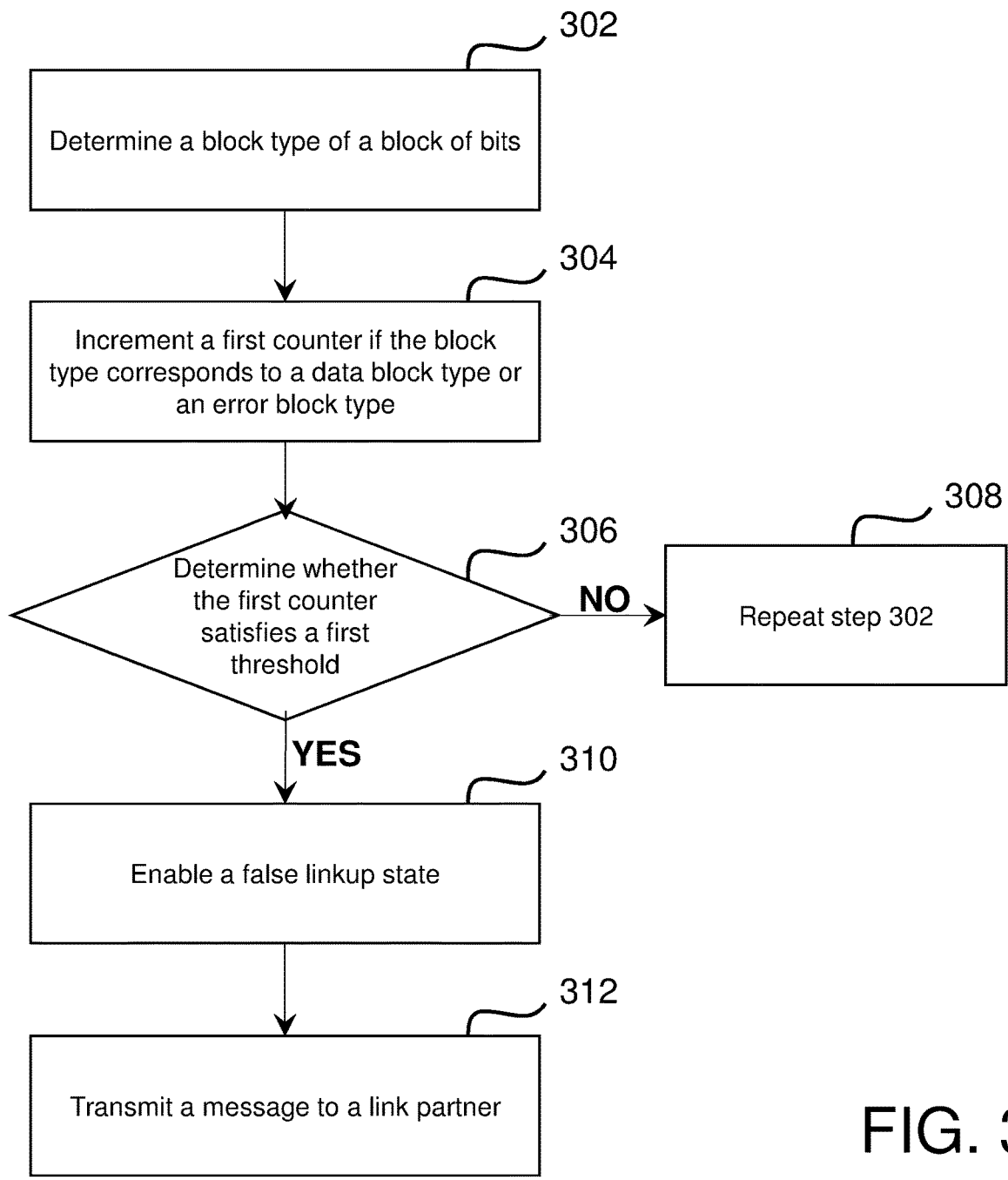
FIG. 3 is a flowchart of a non-limiting embodiment of a process for detecting a false linkup state in an Ethernet communication link.

Referring now to FIG. 3, FIG. 3 is a flowchart of a non-limiting embodiment of a process 300 for detecting a false linkup state in an Ethernet communication link. In some non-limiting embodiments, one or more of the steps of process 300 may be performed (e.g., completely, partially, etc.) by Ethernet network device 102-1. In some non-limiting embodiments, one or more of the steps of process 300 may be performed (e.g., completely, partially, etc.) by another device or a group of devices separate from or including Ethernet network device 102-1 (e.g., by Ethernet network device 102-2, Ethernet network device 102-N, etc.).

As shown in FIG. 3, at step 302, process 300 includes determining a block type of a block of bits. For example, Ethernet network device 102-1 may determine a block type of a block of bits. In some non-limiting embodiments, the block of bits may include an output from decoder block 126 of Ethernet network device 102-1. In some non-limiting embodiments, Ethernet network device 102-1 may monitor MII 112 to determine a block type of a block of bits provided by decoder block 126 to MII 112. In some non-limiting embodiments, Ethernet network device 102-1 may determine the block type of the block of bits based on a block type field of the block of bits. In some non-limiting embodiments, Ethernet network device 102-1 may determine a block type for each block of bits of a plurality of blocks of bits.

In some non-limiting embodiments, the block of bits may be associated with a layer 1 Ethernet bit stream. For example, the block of bits may be based on an output from decoder block 126 of Ethernet network device 102-1 when a packet is received by Ethernet network device 102-1 or during a false linkup state where packets are not being transmitted between Ethernet network device 102-1 and Ethernet network device 102-2. In some non-limiting embodiments, the block of bits may be based on an output from decoder block 126 of Ethernet network device 102-1 that occurs during an interframe gap (IFG) between two packets or a plurality of packets. In some non-limiting embodiments, the block of bits may be based on an output from decoder block 126 of Ethernet network device 102-1 where the output may be based on control information and/or status information received by Ethernet network device 102-1 via an Ethernet communication link, such as remote fault status information and local fault status information. For example, the block of bits may be based on the output from decoder block 126 of Ethernet network device 102-1 when the output includes an ordered set (e.g., a sequence ordered set or a signal ordered set).

In some non-limiting embodiments, the block of bits may be associated with a packet received by Ethernet network device 102-1 from Ethernet network device 102-2. In some non-limiting embodiments, Ethernet network device 102-1 may be a link partner of Ethernet network device 102-1 on the Ethernet communication link. In some non-limiting embodiments, the packet comprises an Ethernet frame that includes the block of bits. In some non-limiting embodiments, Ethernet network device 102-1 may decode the Ethernet frame to provide the block of bits. For example, SerDes block 132 may receive the packets in the form of a serial bit stream and SerDes block 132 may provide a parallel output in the form of a set of bits (e.g., 16 bits).

In some non-limiting embodiments, the block of bits may include a block of 66 bits, where the block includes a preamble of 2 bits (e.g., a 2 bit preamble) and 64 payload bits. In some non-limiting embodiments, descrambler block 128 of Ethernet network device 102-1 may descramble a block of 66 bits and decoder block 126 of Ethernet network device 102-1 may decode the 66 bits based on a 64b/66b encoding/decoding scheme to provide the 64 payload bits. In some non-limiting embodiments, the 2 bit preamble of the block may be a synchronization header that is used by block synchronization function 130 of Ethernet network device 102-1 to synchronize a plurality of blocks of bits. In some non-limiting embodiments, Ethernet network device 102-1 may achieve block lock when the plurality of blocks of bits are synchronized by block synchronization function 130 based on a synchronization header of each of the blocks of bits of the plurality of blocks of bits.

In some non-limiting embodiments, Ethernet network device 102-1 may continuously and sequentially receive a plurality of packets from Ethernet network device 102-2 that are transmitted on transmission medium 124 via an Ethernet communication link. As each packet is received, Ethernet network device 102-1 may determine an Ethernet frame from each packet of the plurality of packets and Ethernet network device 102-1 may determine one or more blocks of bits from each Ethernet frame. Ethernet network device 102-1 may determine a block type of the one or more blocks of bits of each Ethernet frame as the one or more blocks of each Ethernet frame are processed by PCS block 116 of Ethernet network device 102-1.

As shown in FIG. 3, at step 304, process 300 includes incrementing a first counter if the block type corresponds to a data block type or an error block type. For example, Ethernet network device 102-1 may increment a first counter based on determining that the block type of a block of bits corresponds to (e.g., matches) a data block type or an error block type. In some non-limiting embodiments, Ethernet network device 102-1 may increment the first counter based on each block of bits of a plurality of blocks of bits that has a block type that corresponds to a data block type or an error block type. For example, Ethernet network device 102-1 may increment the first counter each time Ethernet network device 102-1 determines that a block type of one or more blocks of bits of an Ethernet frame corresponds to a data block type or an error block type.

In some non-limiting embodiments, Ethernet network device 102-1 may forego incrementing the first counter based on determining that a block of bits does not have a block type that corresponds to a data block type or an error block type. In some non-limiting embodiments, Ethernet network device 102-1 may initialize (e.g., set to 0, reset to 0, etc.) the first counter based on determining that a block of bits does not have a block type that corresponds to a data block type or an error block type. Additionally or alternatively, Ethernet network device 102-1 may disable a flag indicating that there is a false linkup state in an Ethernet communication link based on determining that the block type of the block of bits does not correspond to a data block type or an error block type.

As shown in FIG. 3, at step 306, process 300 includes determining whether the first counter satisfies a first threshold. For example, Ethernet network device 102-1 may determine whether the first counter satisfies the first threshold by comparing a value of the first counter to the first threshold. In some non-limiting embodiments, the first threshold may be set to a value associated with a maximum packet size (e.g., maximum length of a packet). For example, the first threshold may be set to a value that is equal to or greater than a maximum packet size (e.g., a jabber size, a maximum size of a packet transmitted in an Ethernet communication link, etc.), in bytes, divided by 8. In one example, the maximum packet size may be equal to 1518 bytes and the first threshold may be set to a value equal to 190. The value of the first threshold may not be set to less than the maximum packet size divided by 8 because a threshold with a value less than the maximum packet size divided by 8 may cause Ethernet network device 102-1 to determine that there is a false linkup state in an Ethernet communication link based on packets that have lengths that are valid and are not associated with long packet errors (e.g., jabber).

In some non-limiting embodiments, Ethernet network device 102-1 may determine whether the first counter satisfies the first threshold based on Ethernet network device 102-1 incrementing the first counter. For example, Ethernet network device 102-1 may determine whether the first counter satisfies the first threshold each time Ethernet network device 102-1 increments the first counter.

As shown in FIG. 3, at step 308 ("NO"), process 300 includes repeating step 302. For example, Ethernet network device 102-1 may determine a block type of another block of bits on determining that the value of the first counter does not satisfy the first threshold.

As shown in FIG. 3, at step 310 ("YES"), process 300 includes enabling a false linkup state. For example, Ethernet network device 102-1 may enable the false linkup state in an Ethernet communication link. In some non-limiting embodiments, Ethernet network device 102-1 may override an output of decoder block 126 so that the output of decoder block 126 is associated with a local fault condition based on enabling the false linkup state. In some non-limiting embodiments, a link fault state machine of Ethernet network device 102-1 may enter a fault state based on Ethernet network device 102-1 enabling the false linkup state. In some non-limiting embodiments, Ethernet network device 102-1 may enable the false linkup state by enabling (e.g., setting) a flag that indicates that there is a false linkup state in an Ethernet communication link with Ethernet network device 102-2.

As shown in FIG. 3, at step 312, process 300 includes transmitting a message to a link partner. For example, Ethernet network device 102-1 may transmit a message to the link partner of an Ethernet communication link, such as Ethernet network device 102-2, based on enabling a false linkup state in the Ethernet communication link. In some non-limiting embodiments, the message may include an indication that there is a false linkup state on the Ethernet communication link. For example, the message may include an indication that there is a false linkup state on the Ethernet communication link to an Ethernet network device that is a link partner of the Ethernet communication link.

Figure 4:
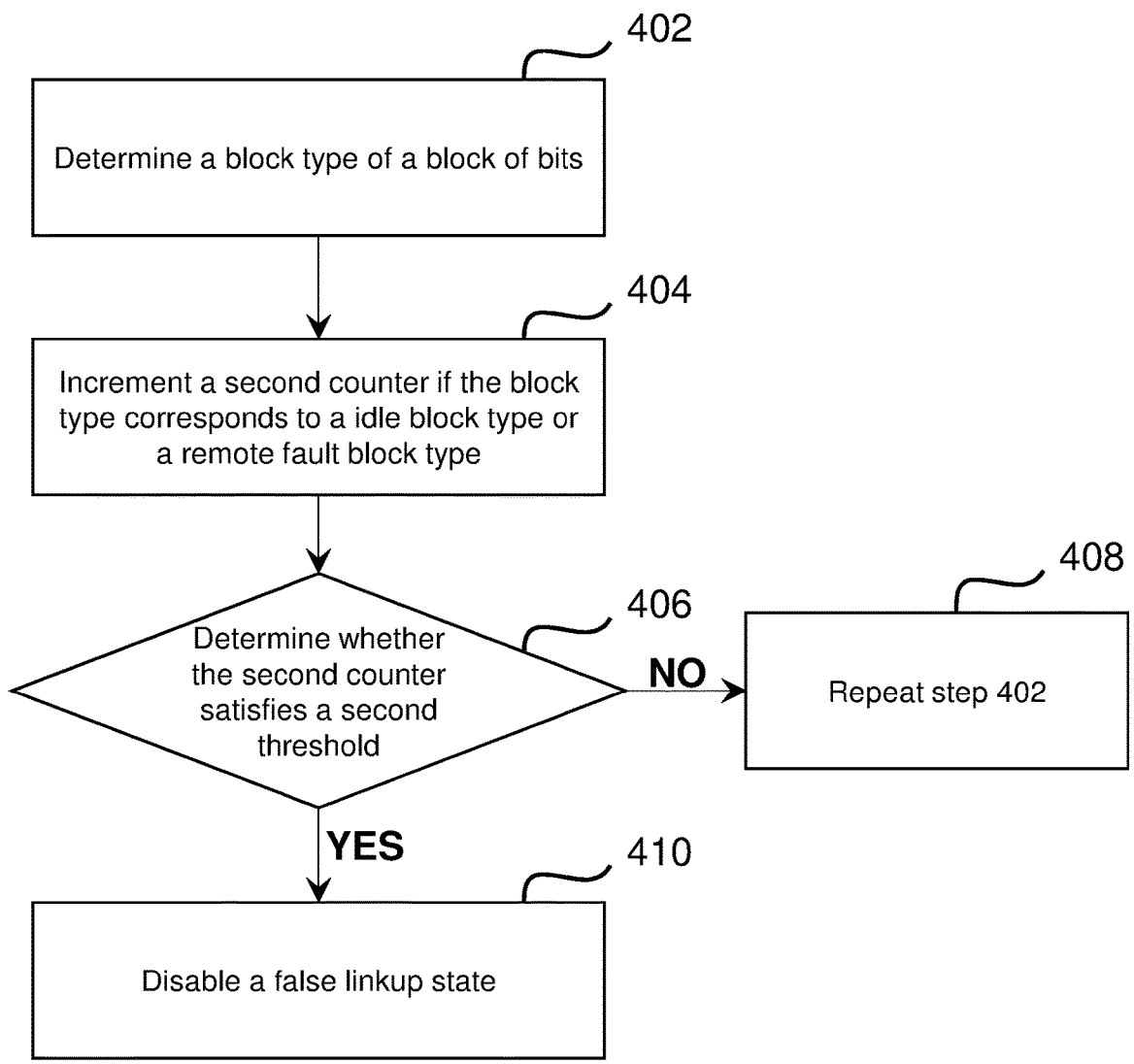
FIG. 4 is a flowchart of a non-limiting embodiment of a process for detecting that a false linkup state is not present in an Ethernet communication link.

Referring now to FIG. 4, FIG. 4 is a flowchart of a non-limiting embodiment of a process 400 for detecting that a false linkup state is not present in an Ethernet communication link. In some non-limiting embodiments, one or more of the steps of process 300 may be performed (e.g., completely, partially, etc.) by Ethernet network device 102-1. In some non-limiting embodiments, one or more of the steps of process 300 may be performed (e.g., completely, partially, etc.) by another device or a group of devices separate from or including Ethernet network device 102-1 (e.g., by Ethernet network device 102-2, Ethernet network device 102-N, etc.). In some non-limiting embodiments, the process 400 may be performed following the process 300 being performed. For example, step 402 of process 400 may be performed after step 312 of process 300 is performed.

As shown in FIG. 4, at step 402, process 400 includes determining a block type of a block of bits. For example, Ethernet network device 102-1 may determine a block type of a block of bits in the same or similar fashion as described above regarding step 302. In some non-limiting embodiments, Ethernet network device 102-1 may determine the block type of the block of bits based on (e.g., after) enabling a false linkup state.

As further shown in FIG. 4, at step 404, process 400 includes incrementing a second counter if the block type corresponds to an idle block type or a remote fault block type. For example, Ethernet network device 102-1 may increment a second counter based on determining that the block type of a block of bits corresponds to (e.g., matches) an idle block type or a remote fault block type. In some non-limiting embodiments, Ethernet network device 102-1 may increment the second counter based on each block of bits of a plurality of blocks of bits that has a block type that corresponds to an idle block type or a remote fault block type. For example, Ethernet network device 102-1 may increment the first counter each time Ethernet network device 102-1 determines that a block type of one or more blocks of bits of an Ethernet frame corresponds to an idle block type or a remote fault block type.

In some non-limiting embodiments, Ethernet network device 102-1 may forego incrementing the second counter based on determining that a block of bits does not have a block type that corresponds to an idle block type or a remote fault block type. In some non-limiting embodiments, Ethernet network device 102-1 may initialize (e.g., set to 0, reset to 0, etc.) the second counter based on determining that a block of bits does not have a block type that corresponds to an idle block type or a remote fault block type. Additionally or alternatively, Ethernet network device 102-1 may enable a flag indicating that there is a false linkup state in an Ethernet communication link based on determining that the block type of the block of bits does not correspond to an idle block type or a remote fault block type.

As further shown in FIG. 4, at step 406, process 400 includes determining whether the second counter satisfies a second threshold. For example, Ethernet network device 102-1 may determine whether the second counter satisfies the second threshold by comparing a value of the second counter to the second threshold. In some non-limiting embodiments, the second threshold may be set to a value associated with a statistical determination that an Ethernet communication link (e.g., an Ethernet communication link based on a layer 1 Ethernet bit stream) is in a valid state. For example, the value of the second threshold may be based on a repetition of particular block types (e.g., a repetition of remote fault block types and/or idle block types), a number of repetitions of particular block types, and/or the like. In some non-limiting embodiments, the second threshold may be set to a value that is equal to a predetermined number of blocks of bits that have block types of an idle block type and/or a remote fault block from SerDes 132. In some non-limiting embodiments, the second threshold may be set to a value that is equal to a predetermined number of blocks of bits that have block types of an idle block type and/or a remote fault block type that are transmitted by a link partner (e.g., a network device, a remote SerDes, etc.) after a false linkup state is enabled. In some non-limiting embodiments, the second threshold may be set to a value equal to 8.

In some non-limiting embodiments, Ethernet network device 102-1 may determine whether the second counter satisfies the second threshold based on Ethernet network device 102-1 incrementing the second counter. For example, Ethernet network device 102-1 may determine whether the second counter satisfies the second threshold each time Ethernet network device 102-1 increments the second counter.

As further shown in FIG. 4, at step 408 ("NO"), process 400 includes repeating step 402. For example, Ethernet network device 102-1 may determine a block type of another block of bits on determining that the value of the second counter does not satisfy the second threshold.

As further shown in FIG. 4, at step 410 ("YES"), process 400 includes disabling a false linkup state. For example, Ethernet network device 102-1 may disable the false linkup state in an Ethernet communication link. In some non-limiting embodiments, Ethernet network device 102-1 may stop an override of an output of decoder block 126 so that the output of decoder block 126 is no longer associated with a local fault condition based on disabling the false linkup state. In some non-limiting embodiments, a link fault state machine of Ethernet network device 102-1 may enter a non-fault state based on Ethernet network device 102-1 disabling the false linkup state. In some non-limiting embodiments, Ethernet network device 102-1 may disable the false linkup state by disabling (e.g., removing a setting of) a flag that indicates that there is a false linkup state in an Ethernet communication link with Ethernet network device 102-2.

FIGS. 5A-5M are diagrams of a non-limiting embodiment of an example implementation 500 described herein. As shown in FIGS. 5A-5M, implementation 500 may include Ethernet network device 502-1 and/or Ethernet network device 502-2. In some non-limiting embodiments, Ethernet network device 502-1 may be the same or similar to Ethernet network device 102-1. In some non-limiting embodiments, Ethernet network device 502-2 may be the same or similar to Ethernet network device 102-2. In some non-limiting embodiments, Ethernet network device 502-1 and/or 502-2 may be the same as or similar to Ethernet network device 102-N.

As shown by reference number 510 in FIG. 5A, Ethernet network device 502-1 may receive a packet including an Ethernet frame. For example, Ethernet network device 502-1 may receive a packet including an Ethernet frame from Ethernet network device 502-2. In some non-limiting embodiments, the Ethernet frame may include a block of bits that are associated with Ethernet network device 502-2. For example, the Ethernet frame may include a block of bits that are associated with Ethernet network device 502-2, where Ethernet network device 502-2 is a link partner of an Ethernet communication link. In such an example, Ethernet network device 502-1 may also be a link partner of the Ethernet communication link.

As shown by reference number 512 in FIG. 5B, Ethernet network device 502-1 may decode the Ethernet frame. For example, Ethernet network device 502-1 may decode the Ethernet frame and Ethernet network device 502-1 may determine a block of bits based on Ethernet network device 502-1 decoding the Ethernet frame.

Figure 5C:
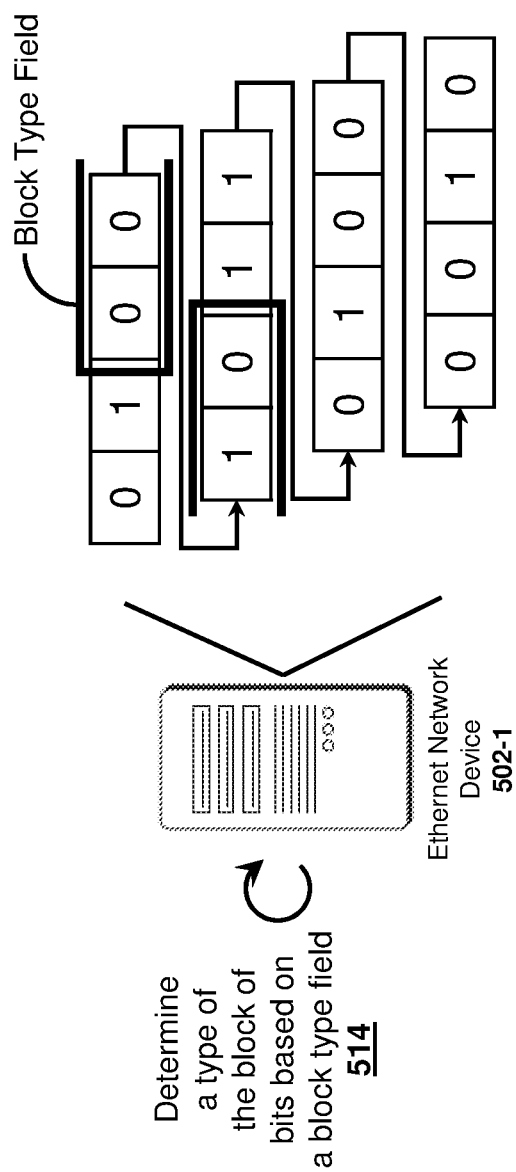

As shown by reference number 514 in FIG. 5C, Ethernet network device 502-1 may determine a type of the block of bits based on a block type field of the block of bits.

Figure 5D:
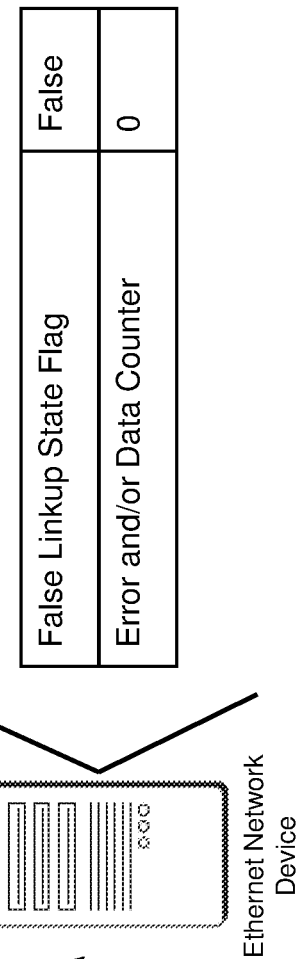

As shown by reference number 516 in FIG. 5D, Ethernet network device 502-1 may initialize a first counter and/or enable a false linkup state flag. For example, Ethernet network device 502-1 may initialize the first counter based on Ethernet network device 502-1 determining that the block type of the block of bits does not correspond to a data block type or an error block type. In an example, Ethernet network device 502-1 may enable or disable a false linkup state flag that indicates whether a false linkup state exists in the Ethernet communication link. In such an example, Ethernet network device 502-1 may enable or disable the false linkup state flag based on Ethernet network device 502-1 determining that the block type of the block of bits does not correspond to a data block type or an error block type.

Figure 5E:
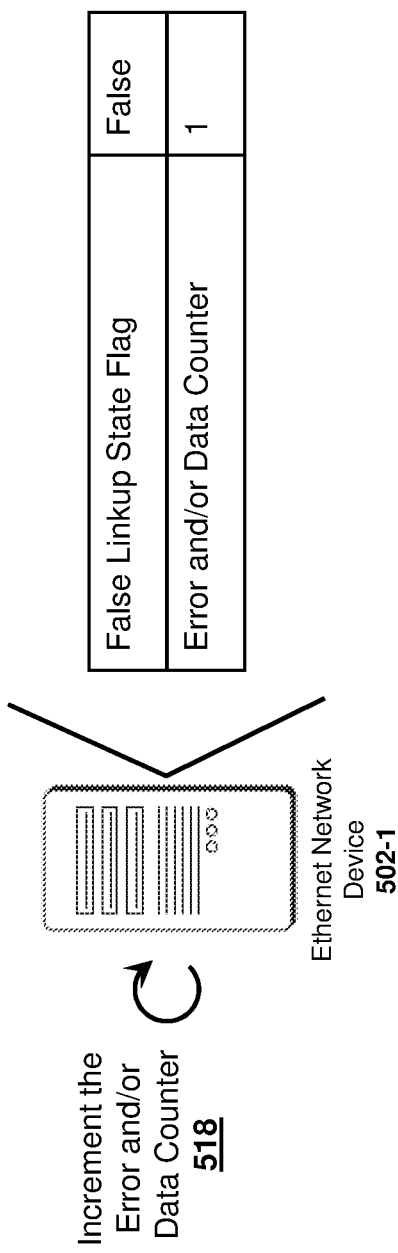

As shown by reference number 518 in FIG. 5E, Ethernet network device 502-1 may increment the Error and/or Data counter. For example, Ethernet network device 502-1 may increment the Error and/or Data counter based on Ethernet network device 502-1 determining that the block type of the block of bits corresponds to a data block type and/or an error block type.

Figure 5F:
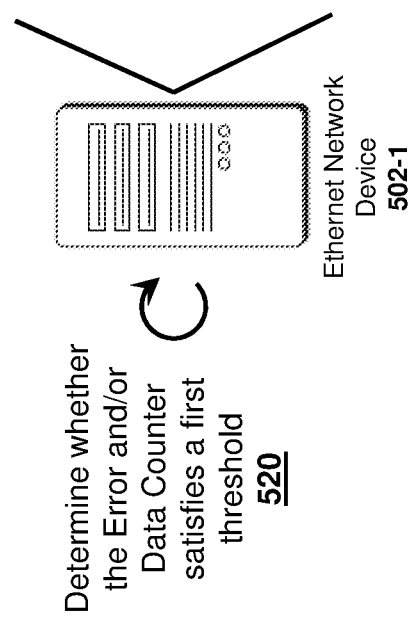

As shown by reference number 520 in FIG. 5F, Ethernet network device 502-1 may determine whether the Error and/or Data counter satisfies a first threshold. For example, Ethernet network device 502-1 may compare the value associated with the Error and/or Data counter and Ethernet network device 502-1 may determine that the value associated with the Error and/or Data counter does not satisfy the first threshold.

Figure 5G:
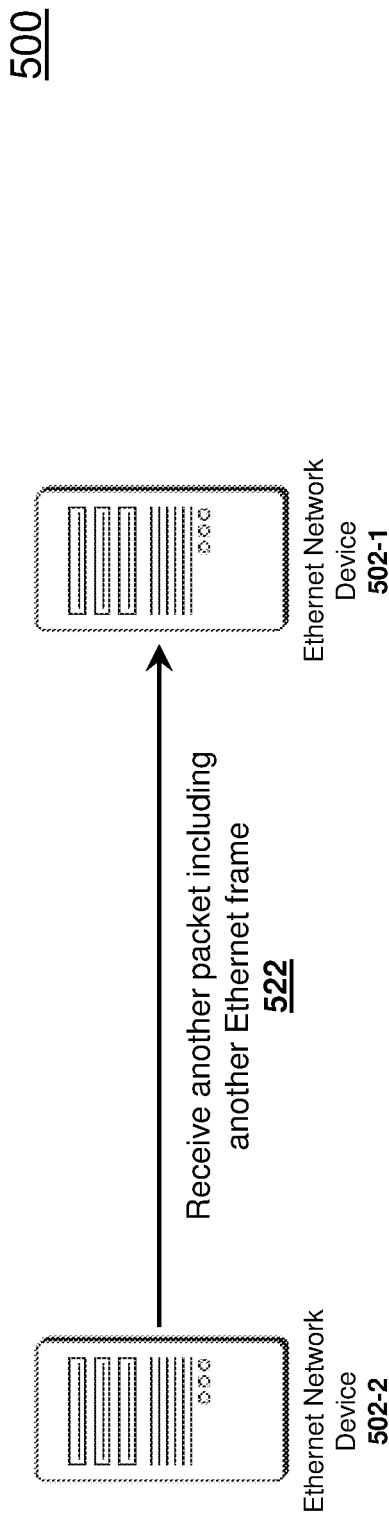

As shown by reference number 522 in FIG. 5G, Ethernet network device 502-1 may receive another packet including another Ethernet frame. For example, Ethernet network device 502-1 may receive another packet including another Ethernet frame from Ethernet network device 502-2. In some non-limiting embodiments, the other Ethernet frame may include another block of bits that is associated with Ethernet network device 502-2. In some non-limiting embodiments, Ethernet network device 502-2 may receive a plurality of packets including a plurality of Ethernet frames and process the plurality of Ethernet frames as described herein.

Figure 5H:
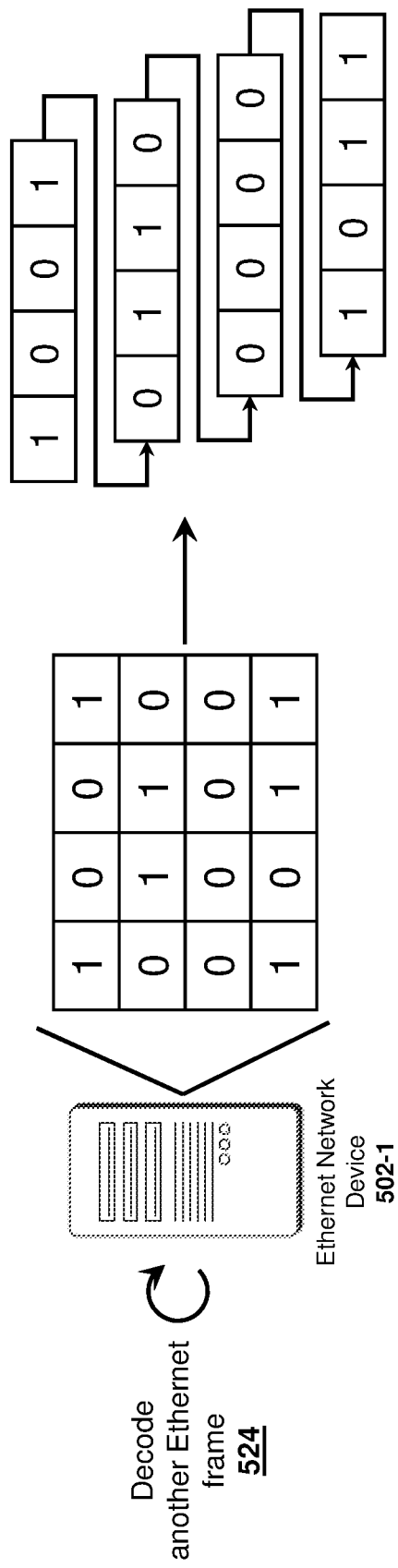

As shown by reference number 524 in FIG. 5H, Ethernet network device 502-1 may decode another Ethernet frame. For example, Ethernet network device 502-1 may decode another Ethernet frame and Ethernet network device 502-1 may determine another block of bits based on Ethernet network device 502-1 decoding another Ethernet frame.

As shown by reference number 526 in FIG. 5I, Ethernet network device 502-1 may determine a block type of the other block of bits based on a block type field of the other block of bits.

As shown by reference number 528 in FIG. 5J, Ethernet network device 502-1 may increment the Error and/or Data counter. For example, Ethernet network device 502-1 may increment the Error and/or Data counter based on Ethernet network device 502-1 determining that the block type of the other block of bits does not correspond to a data block type and/or an error block type. In an example, Ethernet network device 502-1 may enable or disable the false linkup state flag that indicates whether a false linkup state exists in the Ethernet communication link. In such an example, Ethernet network device 502-1 may enable or disable the false linkup state flag based on Ethernet network device 502-1 determining that the block type of the other block of bits does not correspond to a data block type and/or an error block type.

Figure 5K:
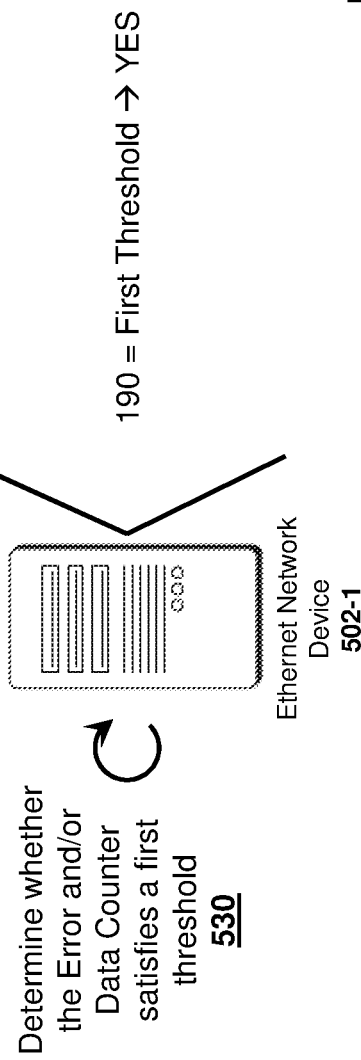

As shown by reference number 530 in FIG. 5K, Ethernet network device 502-1 may determine whether the Error and/or Data counter satisfies a first threshold. For example, Ethernet network device 502-1 may compare the value associated with the Error and/or Data counter after Ethernet network device 502-1 increments the Error and/or Data counter one or more times. In such an example, Ethernet network device 502-1 may determine that the value associated with the Error and/or Data counter does satisfy the first threshold based on Ethernet network device 502-1 comparing the value associated with the Error and/or Data counter to the first threshold.

Figure 5L:
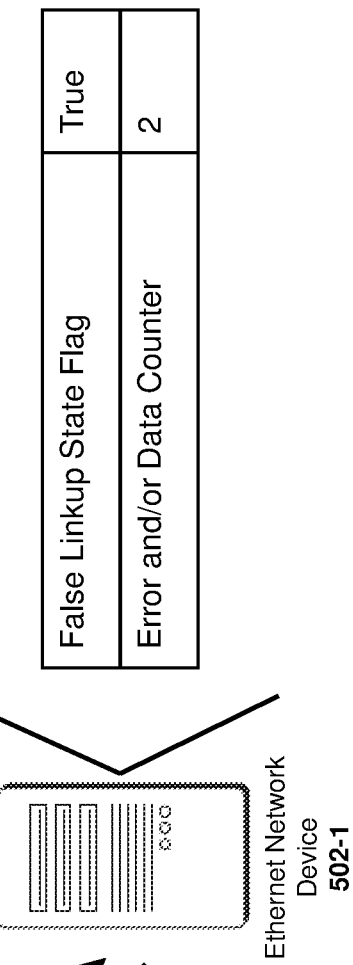

As shown by reference number 532 in FIG. 5L, Ethernet network device 502-1 may enable the false linkup state flag. For example, Ethernet network device 502-1 may enable the false linkup state flag to cause the false linkup state flag to indicate that there is a false linkup state in the Ethernet communication link. In some non-limiting embodiments, Ethernet network device 502-1 may enable the false linkup state flag to cause the false linkup state flag to indicate that there is a false linkup state in the Ethernet communication link determining that the value associated with the Error and/or Data counter satisfies the first threshold.

Figure 5M:
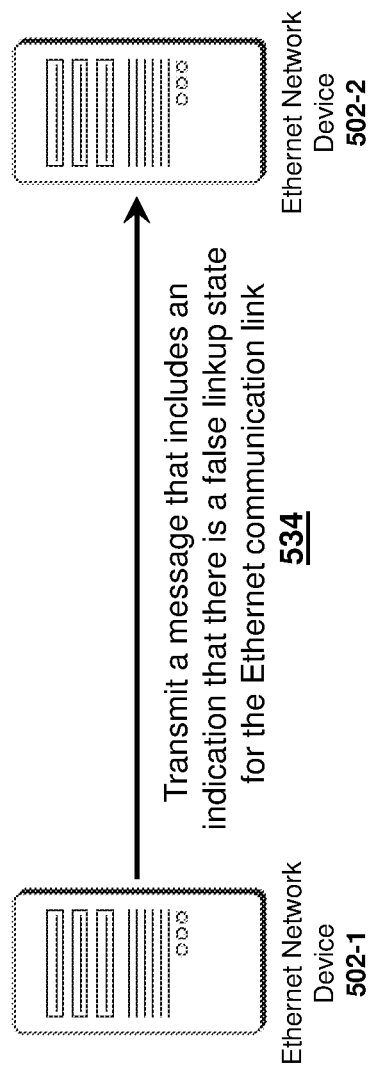

As shown by reference number 534 in FIG. 5M, Ethernet network device 502-1 may transmit a message that includes an indication that there is a false linkup state for the Ethernet communication link. For example, Ethernet network device 502-1 may transmit a message that includes an indication that there is a false linkup state for the Ethernet communication link to an Ethernet network device that is a link partner of the Ethernet communication link. In an example, Ethernet network device 502-1 may transmit the message that includes the indication that there is a false linkup state for the Ethernet communication link to an Ethernet network device that is a link partner of the Ethernet communication link, where the Ethernet network device is Ethernet network device 502-2.

In some non-limiting embodiments, Ethernet network device 502-1 may repeat one or more of the steps described. For example, Ethernet network device 502-1 may repeat one or more of the steps described based on (e.g., in response to and/or after) receiving one or more packets from one or more Ethernet network devices. In such an example, the one or more Ethernet network devices that transmit the one or more packets to Ethernet network device 502-1 may or may not be link partners of an Ethernet communication link that is associated with Ethernet network device 502-1.

FIGS. 6A-6L are diagrams of a non-limiting embodiment of an example implementation 600 described herein. As shown in FIGS. 6A-6L, implementation 600 may include Ethernet network device 602-1 and/or Ethernet network device 602-2. In some non-limiting embodiments, Ethernet network device 602-1 may be the same or similar to Ethernet network device 102-1 and/or Ethernet network device 502-1. In some non-limiting embodiments, Ethernet network device 602-2 may be the same or similar to Ethernet network device 102-2 and/or Ethernet network device 502-2.

As shown by reference number 610 in FIG. 6A, Ethernet network device 602-1 may receive a packet including an Ethernet frame. For example, Ethernet network device 602-1 may receive a packet including an Ethernet frame from Ethernet network device 602-2. In some non-limiting embodiments, the Ethernet frame may include a block of bits that are associated with Ethernet network device 602-2. For example, the Ethernet frame may include a block of bits that are associated with Ethernet network device 602-2, where Ethernet network device 602-2 is a link partner of an Ethernet communication link. In such an example, Ethernet network device 602-1 may also be a link partner of the Ethernet communication link.

As shown by reference number 612 in FIG. 6B, Ethernet network device 602-1 may decode the Ethernet frame. For example, Ethernet network device 602-1 may decode the Ethernet frame and Ethernet network device 602-1 may determine a block of bits based on Ethernet network device 602-1 decoding the Ethernet frame.

Figure 6C:
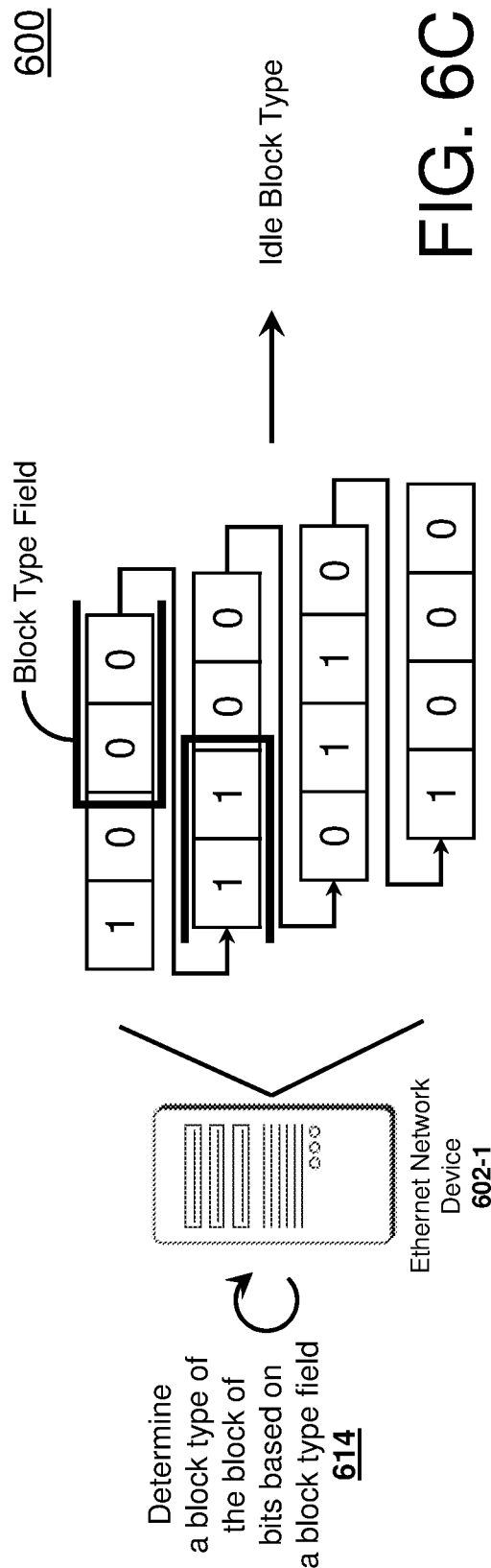

As shown by reference number 614 in FIG. 6C, Ethernet network device 602-1 may determine a block type of the block of bits based on a block type field.

Figure 6D:
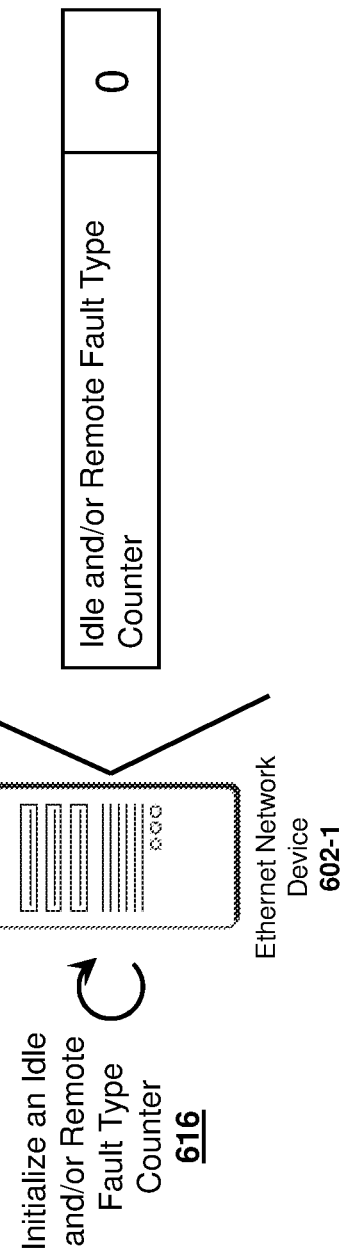

As shown by reference number 616 in FIG. 6D, Ethernet network device 602-1 may initialize an idle and/or remote fault type counter. For example, Ethernet network device 602-1 may initialize the idle and/or remote fault type counter based on Ethernet network device 602-1 determining that the block type of the block of bits corresponds to an idle block type and/or a remote fault block type.

Figure 6E:
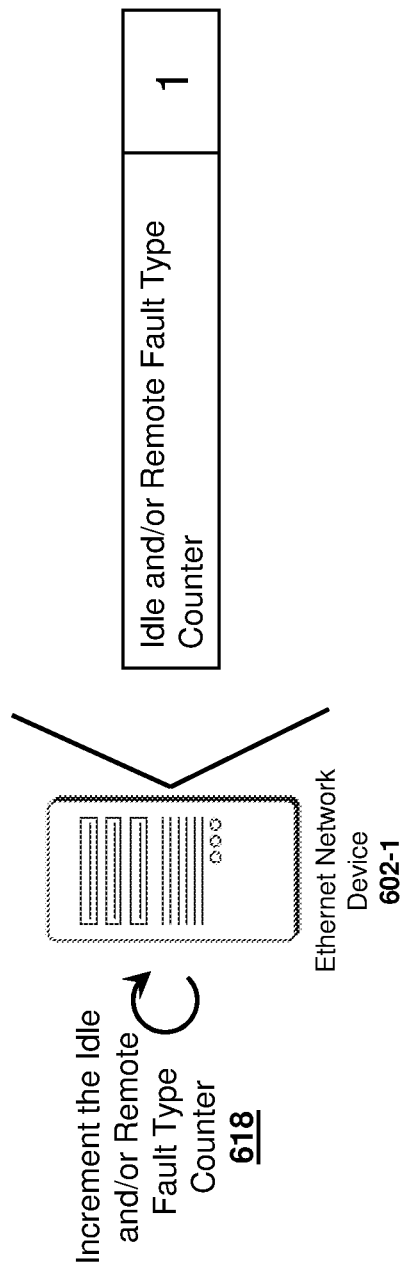

As shown by reference number 618 in FIG. 6E, Ethernet network device 602-1 may increment the idle and/or remote fault type counter. For example, Ethernet network device 602-1 may increment the idle and/or remote fault type counter based on Ethernet network device 602-1 determining that the block type of the block of bits corresponds to an idle block type and/or a remote fault block type.

Figure 6F:
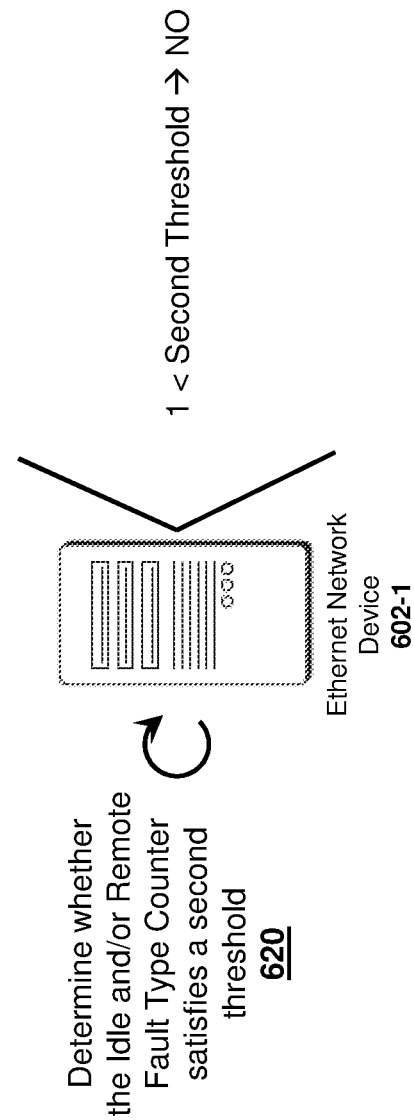

As shown by reference number 620 in FIG. 6F, Ethernet network device 602-1 may determine whether the idle and/or remote fault type counter satisfies a second threshold. For example, Ethernet network device 602-1 may compare the value associated with the idle and/or remote fault type counter and Ethernet network device 602-1 may determine that the value associated with the idle and/or remote fault type counter does not satisfy the second threshold.

Figure 6G:
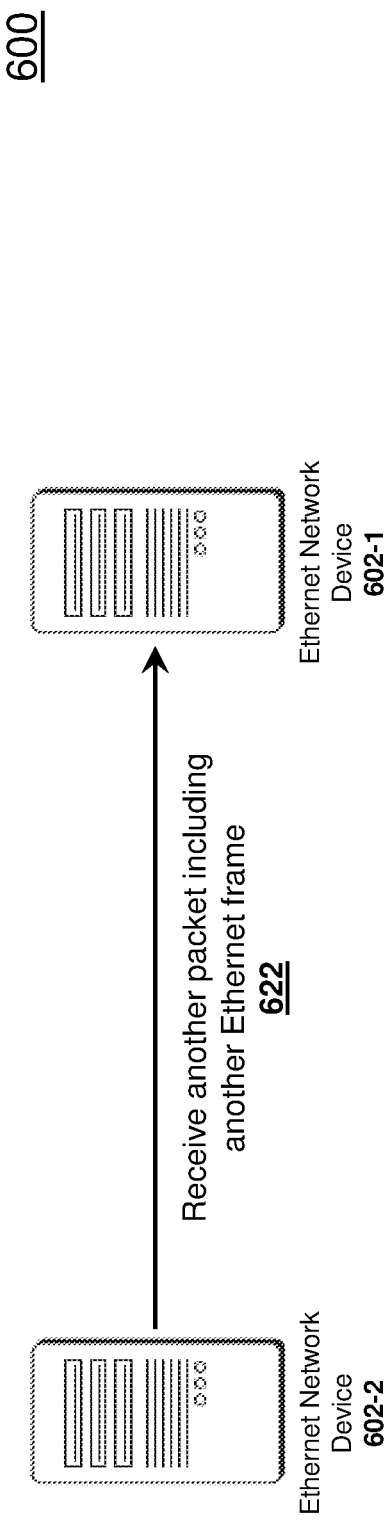

As shown by reference number 622 in FIG. 6G, Ethernet network device 602-1 may receive another packet including another Ethernet frame. For example, Ethernet network device 602-1 may receive another packet including another Ethernet frame from Ethernet network device 602-2. In some non-limiting embodiments, Ethernet network device 602-2 may receive a plurality of packets including a plurality of Ethernet frames and process the plurality of Ethernet frames as described herein.

Figure 6H:
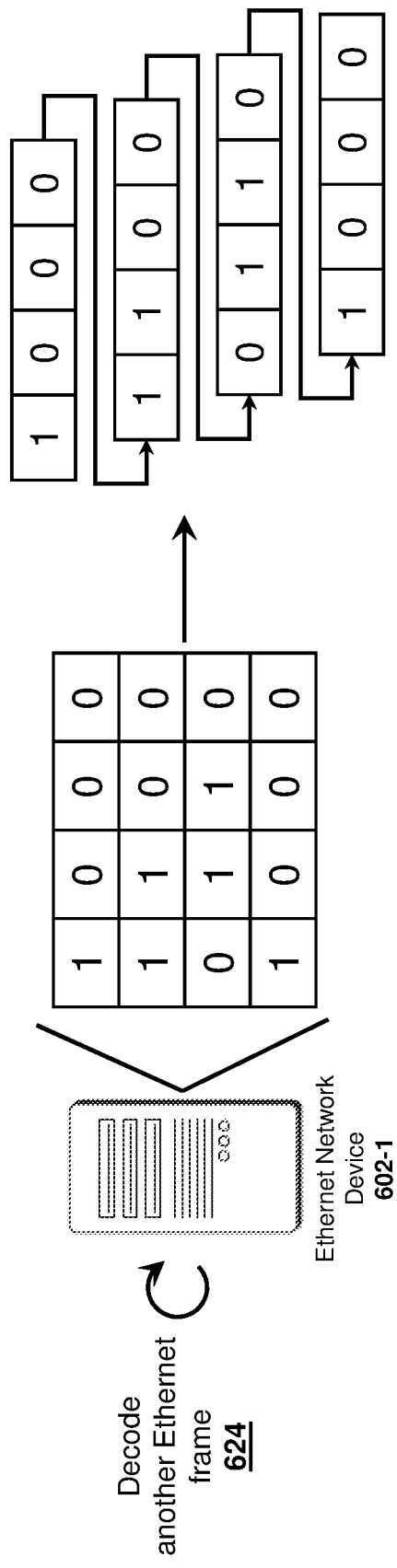

As shown by reference number 624 in FIG. 6H, Ethernet network device 602-1 may decode another Ethernet frame. For example, Ethernet network device 602-1 may decode another Ethernet frame and Ethernet network device 602-1 may determine another block of bits based on Ethernet network device 602-1 decoding another Ethernet frame.

Figure 6I:
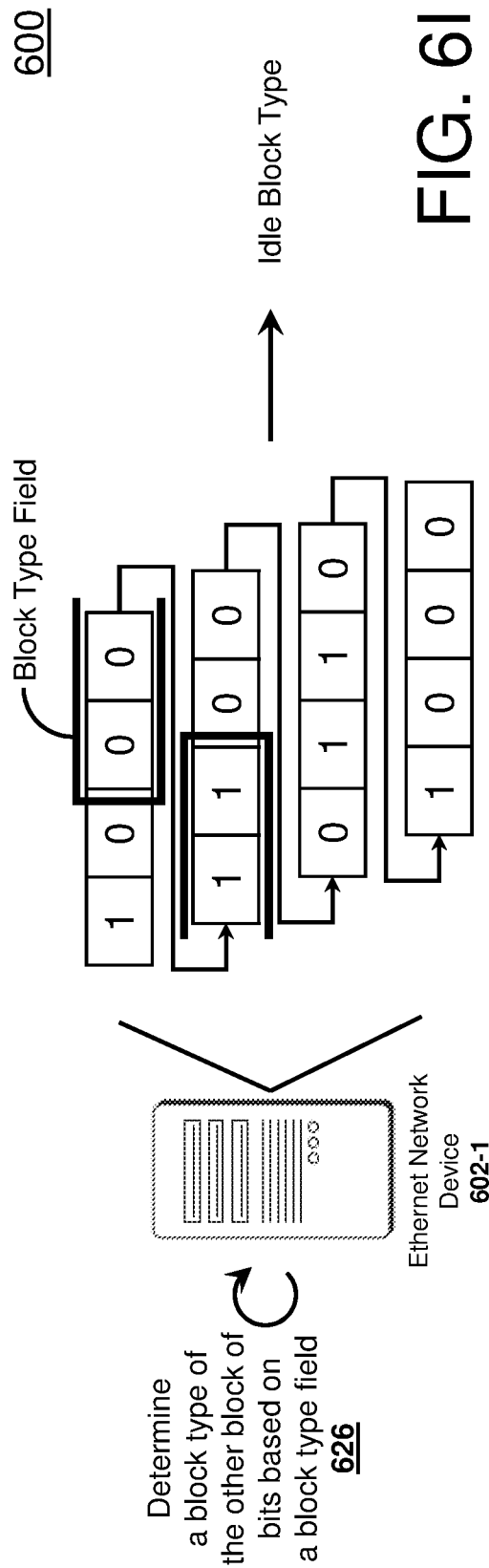

As shown by reference number 626 in FIG. 6I, Ethernet network device 602-1 may determine a block type of the other block of bits based on a block type field.

Figure 6J:
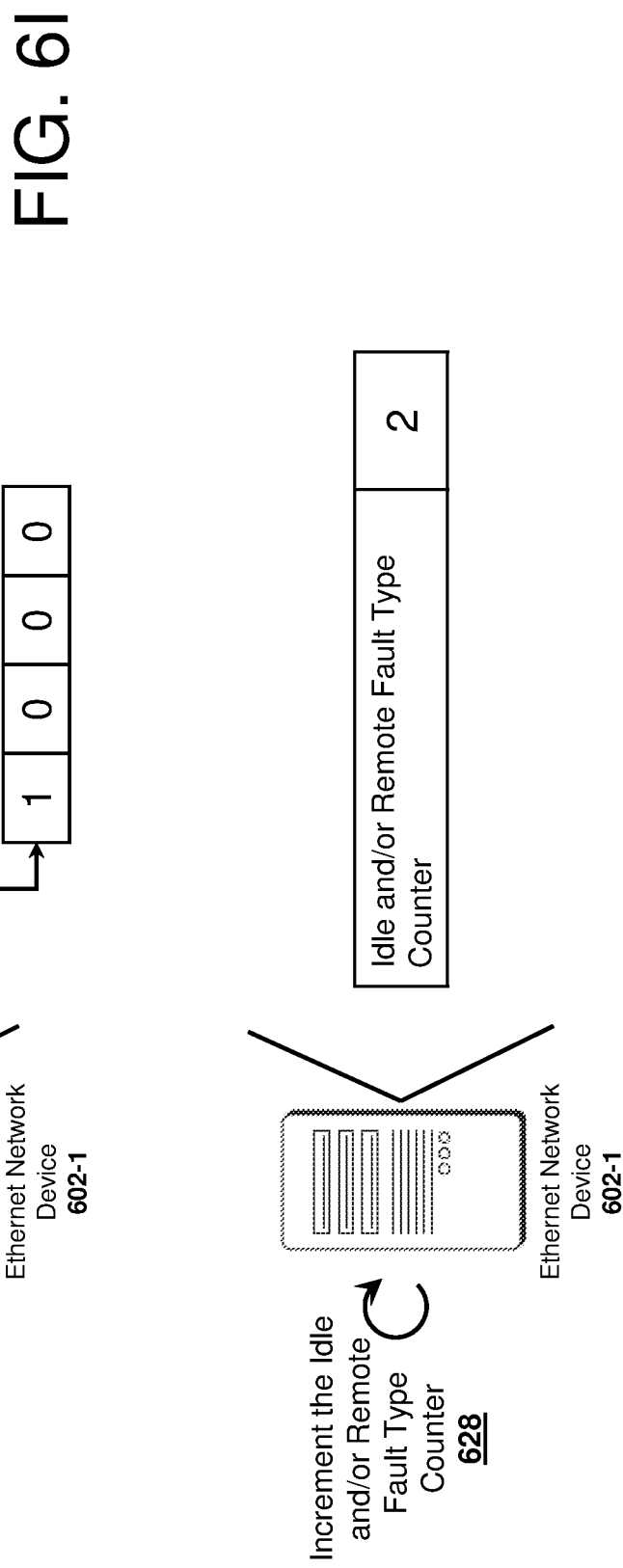

As shown by reference number 628 in FIG. 6J, Ethernet network device 602-1 may increment the idle and/or remote fault type counter. For example, Ethernet network device 602-1 may increment the idle and/or remote fault type counter based on Ethernet network device 602-1 determining that the block type of the other block of bits corresponds to an idle block type and/or a remote fault block type.

As shown by reference number 630 in FIG. 6K, Ethernet network device 602-1 may determine whether the idle and/or remote fault type counter satisfies a second threshold. For example, Ethernet network device 602-1 may determine whether the idle and/or remote fault type counter satisfies a second threshold based on Ethernet network device 602-1 comparing the value associated with the idle and/or remote fault type counter to the second threshold.

As shown by reference number 632 in FIG. 6L, Ethernet network device 602-1 may disable the false linkup state flag. For example, Ethernet network device 602-1 may disable the false linkup state flag based on Ethernet network device 602-1 determining that the value associated with the idle and/or remote fault type counter satisfies the second threshold.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code, it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and be used interchangeably with "one or more" and/or "at least one". Furthermore, as used herein, the term "set" is intended to include one or more items (e.g., related items, unrelated items, a combination of related and unrelated items, etc.), and be used interchangeably with "one or more" and/or "at least one." Where only one item is intended, the term "one" or similar language is used. Also, as used herein, the terms "has," "have," "having," or the like are intended to be open-ended terms. Further, the phrase "based on" is intended to mean "based, at least in part, on", "in response to", or the like, unless explicitly stated otherwise.

What is claimed is:

1. A system for detecting a false linkup state in an Ethernet communication link, comprising:
   at least one processor programmed or configured to:
      receive a block of bits;
      determine whether a block type of the block of bits corresponds to a data block type or an error block type based on a block type field in the block of bits;
      increment a first counter based on determining that the block type of the block of bits corresponds to a data block type or an error block type;
      determine whether the first counter satisfies a first threshold;
      enable a false linkup state in an Ethernet communication link based on determining that the first counter satisfies the first threshold, wherein the false linkup state in the Ethernet communication link is associated with an invalid state of the Ethernet communication link that does not allow valid data to be transmitted and received via the Ethernet communication link; and
      cause to transmit a message including an indication that there is a false linkup state for the Ethernet communication link to an Ethernet network device that is a link partner of the Ethernet communication link based on enabling the false linkup state in the Ethernet communication link.

2. The system of claim 1, wherein the block of bits is associated with a packet received from the Ethernet network device that is the link partner of the Ethernet communication link, wherein the packet comprises an Ethernet frame that includes the block of bits.

3. The system of claim 1, wherein, when receiving the block of bits, the at least one processor is programmed or configured to:
   receive a packet from the Ethernet network device, wherein the packet includes an Ethernet frame; and
   decode the Ethernet frame to provide the block of bits.

4. The system of claim 1, wherein the at least one processor is further programmed or configured to:
   initialize the first counter based on determining that the block type of the block of bits does not correspond to a data block type or an error block type; and
   disable the false linkup state in the Ethernet communication link based on determining that the block type of the block of bits does not correspond to a data block type or an error block type.

5. The system of claim 1, wherein the at least one processor is further programmed or configured to:
   determine a block type of a second block of bits after enabling the false linkup state in the Ethernet communication link; and
   increment a second counter based on determining that the block type of the second block of bits corresponds to an idle block type or a remote fault block type.

6. The system of claim 5, wherein the at least one processor is further programmed or configured to:
   determine whether the second counter satisfies a second threshold; and
   disable the false linkup state in the Ethernet communication link based on determining that the second counter satisfies the second threshold.

7. The system of claim 5, wherein the at least one processor is further programmed or configured to:
   initialize the second counter based on determining that the block type of the block of bits does not correspond to an idle block type or a remote fault block type.

8. A method for detecting a false linkup state in an Ethernet communication link, comprising:
   receiving, with at least one processor, a block type of a block of bits;
   determining, with at least one processor, whether a block type of the block of bits corresponds to a data block type or an error block type based on a block type field in the block of bits;
   incrementing, with at least one processor, a first counter based on determining that the block type of the block of bits corresponds to a data block type or an error block type;
   determining, with at least one processor, whether the first counter satisfies a first threshold;
   enabling, with at least one processor, a false linkup state in an Ethernet communication link based on determining that the first counter satisfies the first threshold, wherein the false linkup state in the Ethernet communication link is associated with an invalid state of the Ethernet communication link that does not allow valid data to be transmitted and received via the Ethernet communication link; and
   transmitting, with at least one processor, a message including an indication that there is a false linkup state for the Ethernet communication link to an Ethernet network device that is a link partner of the Ethernet communication link based on enabling the false linkup state in the Ethernet communication link.

9. The method of claim 8, wherein the block of bits is associated with a packet received from the Ethernet network device that is the link partner, and wherein the packet comprises an Ethernet frame that includes the block of bits.

10. The method of claim 8, wherein receiving the block type of a block of bits comprises:
   receiving a packet from the Ethernet network device, wherein the packet includes an Ethernet frame; and
   decoding the Ethernet frame to provide the block of bits.

11. The method of claim 8, further comprising:
initializing the first counter based on determining that the block type of the block of bits does not correspond to a data block type or an error block type; and
disabling the false linkup state in the Ethernet communication link based on determining that the block type of the block of bits does not correspond to a data block type or an error block type.

12. The method of claim 8, further comprising:
determining a block type of a second block of bits after enabling the false linkup state in the Ethernet communication link; and
incrementing a second counter based on determining that the block type of the second block of bits corresponds to an idle block type or a remote fault block type.

13. The method of claim 12, further comprising:
determining whether the second counter satisfies a second threshold; and
disabling the false linkup state in the Ethernet communication link based on determining that the second counter satisfies the second threshold.

14. A computer program product for detecting a false linkup state in an Ethernet communication link, comprising at least one non-transitory computer-readable medium including one or more instructions that, when executed by at least one processor, cause the at least one processor to:
receive a block type of a block of bits;
determine whether a block type of the block of bits corresponds to a data block type or an error block type based on a block type field in the block of bits;
increment a first counter based on determining that the block type of the block of bits corresponds to a data block type or an error block type;
determine whether the first counter satisfies a first threshold;
enable a false linkup state in an Ethernet communication link based on determining that the first counter satisfies the first threshold, wherein the false linkup state in the Ethernet communication link is associated with an invalid state of the Ethernet communication link that does not allow valid data to be transmitted and received via the Ethernet communication link; and
cause to transmit an indication that there is a false linkup state for the Ethernet communication link to an Ethernet network device that is a link partner of the Ethernet communication link based on enabling the false linkup state in the Ethernet communication link.

15. The computer program product of claim 14, wherein the block of bits is associated with a packet received from the Ethernet network device that is the link partner, wherein the packet comprises an Ethernet frame that includes the block of bits.

16. The computer program product of claim 14, wherein the one or more instructions further cause the at least one processor to:
initialize the first counter based on determining that the block type of the block of bits does not correspond to a data block type or an error block type.

17. The computer program product of claim 14, wherein the one or more instructions further cause the at least one processor to:
determine a block type of a second block of bits after enabling the false linkup state in the Ethernet communication link; and
increment a second counter based on determining that the block type of the second block of bits corresponds to an idle block type or a remote fault block type.

18. The computer program product of claim 17, wherein the one or more instructions further cause the at least one processor to:
determine whether the second counter satisfies a second threshold; and
disable the false linkup state in the Ethernet communication link based on determining that the second counter satisfies the second threshold.

* * * * *